United States Patent
Ise et al.

(10) Patent No.: US 6,255,018 B1
(45) Date of Patent: Jul. 3, 2001

(54) HYDROGEN STORING ALLOY ELECTRODE AND PROCESS FOR PRODUCING HYDROGEN STORAGE ALLOY ELECTRODE

(75) Inventors: Tadashi Ise; Hiroshi Fukuda, both of Itano-gun; Teruhiko Imoto; Kikuko Kato, both of Katano; Yasushi Kuroda, Tokushima; Nobuyuki Higashiyama, Mino; Yoshinori Matsuura; Mamoru Kimoto, both of Hirakata; Mitsuzou Nogami, Itano-gun; Shin Fujitani, Hirakata; Ikuo Yonezu, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/214,111
(22) PCT Filed: Jun. 20, 1997
(86) PCT No.: PCT/JP97/02146
§ 371 Date: Jun. 11, 1999
§ 102(e) Date: Jun. 11, 1999
(87) PCT Pub. No.: WO97/50135
PCT Pub. Date: Dec. 31, 1997

(30) Foreign Application Priority Data

| Jun. 26, 1996 | (JP) | 8-165753 |
| Jun. 26, 1996 | (JP) | 8-165754 |
| Nov. 15, 1996 | (JP) | 8-304598 |
| Dec. 10, 1996 | (JP) | 8-328973 |
| Mar. 13, 1997 | (JP) | 9-59556 |

(51) Int. Cl.[7] .............. H01M 4/58; H01M 4/32; H01M 6/00
(52) U.S. Cl. .......... 429/218.2; 429/218; 429/223; 29/623.5; 148/513
(58) Field of Search .............. 429/218, 223, 429/218.2; 29/623.5; 148/513

(56) References Cited

U.S. PATENT DOCUMENTS

| 4,231,813 | * | 11/1980 | Carlin | 148/6.3 |
| 4,621,417 |   | 11/1986 | Mohri et al. | |
| 4,902,579 | * | 2/1990 | Grasselli et al. | 428/610 |
| 5,278,001 | * | 1/1994 | Ono et al. | 429/101 |
| 5,358,907 | * | 10/1994 | Wong | 437/230 |
| 5,518,509 | * | 5/1996 | Tadokoro et al. | 29/623.5 |
| 5,629,000 | * | 5/1997 | Matsuura et al. | 429/218 |
| 5,629,111 | * | 5/1997 | Yamawaki et al. | 429/223 |

(List continued on next page.)

FOREIGN PATENT DOCUMENTS

| 60-185362 | 9/1985 | (JP) . |
| 2-51860 | 2/1990 | (JP) . |
| 6-88150 | 3/1994 | (JP) . |
| 6-279980 | 10/1994 | (JP) . |
| 9-129226 | 5/1997 | (JP) . |
| 10012233A | * 1/1998 | (JP) | 228/218 |

Primary Examiner—Patrick Ryan
Assistant Examiner—L. Edmondson
(74) Attorney, Agent, or Firm—Armstrong, Westerman, Hattori, McLeland & Naughton LLP

(57) ABSTRACT

An object of the present invention is to provide an effective hydrogen-absorbing alloy activation process which can enhance the electrochemical activity of a hydrogen-absorbing alloy and to provide a hydrogen-absorbing alloy electrode which, when used in a battery, ensures an excellent initial inner pressure characteristic, low-temperature discharge characteristic, high-rate discharge characteristic and cycle characteristic. In accordance with the present invention, a hydrogen-absorbing alloy electrode production process is provided which comprises an alloy activation treatment step of immersing a hydrogen-absorbing alloy in a strong acid treatment solution containing metal ions and, in the course of the pH rise of the acid treatment solution, adding an alkali to the acid treatment solution to promote the pH rise of the acid treatment solution.

43 Claims, 7 Drawing Sheets

U.S. PATENT DOCUMENTS

| | | | |
|---|---|---|---|
| 5,688,616 | * | 11/1997 | Yamawaki et al. .................. 429/223 |
| 5,882,723 | * | 3/1999 | Tsou ..................................... 427/125 |
| 5,935,732 | * | 8/1999 | Matsumura et al. .............. 429/218.2 |
| 5,943,545 | * | 8/1999 | Ise ......................................... 419/31 |
| 5,985,057 | * | 11/1999 | Imoto et al. ......................... 148/513 |
| 6,010,582 | * | 1/2000 | Ise et al. .............................. 148/513 |
| 6,040,087 | * | 3/2000 | Kawakami ........................ 429/218.1 |
| 6,066,415 | * | 5/2000 | Sakai et al. ....................... 429/218.2 |
| 6,110,433 | * | 8/2000 | Kleinsorgen et al. .............. 423/21.1 |

\* cited by examiner

HYDROGEN STORING ALLOY ELECTRODE AND PROCESS FOR PRODUCING HYDROGEN STORAGE ALLOY ELECTRODE

TECHNICAL FIELD

The present invention relates to a hydrogen-absorbing alloy electrode for use in an alkaline secondary battery such as a nickel-hydrogen secondary battery and, more particularly, to a method for enhancing the electrochemical activity of a hydrogen-absorbing alloy electrode.

BACKGROUND ART

Nickel-hydrogen secondary batteries have been known as one type of alkaline secondary batteries. The nickel-hydrogen secondary battery typically employs as its negative electrode a hydrogen-absorbing alloy electrode utilizing a hydrogen-absorbing alloy.

Examples of the hydrogen-absorbing alloy for the negative electrode include Mm-based hydrogen-absorbing alloys comprising a Misch metal which is a mixture of rare earth elements, and Laves-phase hydrogen-absorbing alloys.

However, these hydrogen-absorbing alloys are generally susceptible to natural oxidation so that an oxide film and the like are formed on the surfaces thereof. Where an alkaline secondary battery employs as its negative electrode a hydrogen-absorbing alloy electrode formed of such a hydrogen-absorbing alloy, hydrogen gas cannot sufficiently be absorbed by the electrode because the hydrogen-absorbing alloy has a low activity in an initial cycle. This presents problems such as a reduced battery capacity and an increased battery inner pressure in the initial cycle.

To this end, a variety of methods have been proposed to recover the electrochemical activity of the hydrogen-absorbing alloy as a negative electrode active substance. One of the methods is an acid treatment wherein a hydrogen-absorbing alloy is immersed in an acid treatment solution such as containing hydrochloric acid to remove an oxide film from the surface of the hydrogen-absorbing alloy (Japanese Unexamined Patent Publications No. 4-179055 (1992), No. 5-225975 (1993), No. 7-73878 (1995), No. 7-153460 (1995) and the like). The acid treatment ensures a relatively excellent oxide film removing effect, and operations for the treatment is easy. Therefore, the acid treatment is an effective method for the recovery of the electrochemical activity of the hydrogen-absorbing alloy.

Where a hydrogen-absorbing alloy is subjected to the aforesaid conventional acid treatment, active sites appear on the surface of the hydrogen-absorbing alloy. However, the active sites of the hydrogen-absorbing alloy are extremely susceptible to oxidization, so that re-oxidization occurs during a battery fabrication process. Therefore, the conventional acid treatment fails to satisfactorily enhance the activity of the hydrogen-absorbing alloy electrode in the initial cycle. Accordingly, an alkaline secondary battery employing such a hydrogen-absorbing alloy electrode suffers an increase in the inner pressure during initial charging, a low initial discharge capacity, a poor low-temperature discharge characteristic, and a poor high-rate discharge characteristic.

DISCLOSURE OF THE INVENTION

It is an object of the present invention to solve the aforesaid problems associated with the hydrogen-absorbing alloy electrode.

To attain the aforesaid object, the inventors of the present invention have made intensive studies on an acid treatment for surface-treating a hydrogen-absorbing alloy with an acid treatment solution. As a result, the inventors have found that a highly active hydrogen-absorbing alloy can be obtained by promoting the pH rise of an acid treatment solution during an acid treatment of a hydrogen-absorbing alloy or by using an acid treatment solution containing metal ions and promoting the pH rise of the acid treatment solution during the acid treatment, thereby drastically improving the initial inner pressure characteristic and the electrochemical characteristics, such as an initial discharge characteristic, of a battery employing the hydrogen-absorbing alloy as its electrode substance. Thus, the inventors have achieved the present invention.

The following modes of the present invention are based on the same or similar ideas, and have common technical features. However, these modes of the present invention were not completed at a time, but respectively embodied by way of different embodiments. For clarity of explanation, these modes are classified into first, second, third and fourth inventive mode groups, which each include closely related modes, and an explanation will hereinafter be given to each of the inventive mode groups.

(1) First Inventive Mode Group

In accordance with the first mode group of the present invention, a process for producing a hydrogen-absorbing alloy electrode is provided which comprises an alloy activation treatment step wherein a hydrogen-absorbing alloy is surface-treated by immersing the hydrogen-absorbing alloy in an acid treatment solution containing metal ions and initially having a pH level of pH 0.5 to pH 3.0.

With this arrangement, an oxide film and the like on the surface of the alloy react with hydrogen ions so as to be dissolved in the acid treatment solution. As a result, the oxide film is removed, so that an isolated metal layer appears on the surface of the alloy. This reaction entails a pH rise of the solution and, in the course of the pH rise, the metal ions present in the acid treatment solution are deposited on the surface of the alloy in the solution thereby to increase the thickness of the isolated metal layer on the alloy surface. The metal layer deposited on the alloy surface serves as a protective film for hindering the alloy surface from being oxidized by air. Thus, the conductivity and reactivity of the hydrogen-absorbing alloy are enhanced thereby to improve the hydrogen-absorbing ability of the alloy. Therefore, when the hydrogen-absorbing alloy thus treated is used as an electrode active substance, the resulting hydrogen-absorbing alloy electrode has an excellent high-rate discharge characteristic and cycle characteristic.

The cycle characteristic of a battery is improved by the enhancement of the hydrogen-absorbing ability. This is due to the following fact. In general, an alkaline secondary battery employing a hydrogen-absorbing alloy electrode as its negative electrode has a sealed structure and, for safety, is constructed such that a safety valve operates when the pressure inside the battery becomes higher than a predetermined level. If the hydrogen-absorbing alloy electrode of the battery of such a construction has a poor hydrogen-absorbing ability, hydrogen gas is accumulated in the battery thereby to increase the inner pressure of the battery. As a result, the safety valve operates to release the gas accumulated in the battery. At this time, the electrolyte is scattered outside the battery, so that the shortage of the electrolyte occurs to reduce the battery performance. Conversely, if the hydrogen-absorbing alloy as the negative electrode active substance has a high activity, hydrogen gas is smoothly absorbed by the alloy, thereby preventing the increase in the inner pressure of the battery. Since the safety valve has no chance to operate, the battery performance is not deteriorated due to the shortage of the electrolyte. Therefore, the cycle lifetime is extended.

Usable as the metal ions are ions of a metal selected from the group consisting of nickel and cobalt. With these metal ions, an isolated metal layer having an excellent conductivity can be formed on the alloy surface. Thus, the high-rate discharge characteristic and the cycle characteristic can be further improved.

The acid treatment solution may further contain a substance having a pH buffer action for keeping the pH level of the acid treatment solution within a pH range between pH 4 and pH 6. The use of the pH buffering substance is preferred because the deposition of the metal can be increased to thicken the isolated metal layer by continuously keeping the pH level of the acid treatment solution within a pH range between pH 4 to pH 6. Usable as the pH buffering substance are, for example, aluminum ions.

(2) Second Inventive Mode Group

In accordance with one mode of the second inventive mode group, a process for producing a hydrogen-absorbing alloy electrode is provided which comprises an alloy activation treatment step wherein a hydrogen-absorbing alloy is immersed in an acid treatment solution initially having a pH level of pH 0.5 to pH 3.0, and adding an alkaline solution to the acid treatment solution before the pH level of the acid treatment solution rises to pH 5 to promote the pH rise of the acid treatment solution. This mode is referred to as "inventive mode IIA".

In accordance with another mode of the second inventive mode group, a process for producing a hydrogen-absorbing alloy electrode is provided which comprises an alloy activation treatment step wherein a hydrogen-absorbing alloy is immersed in an acid treatment solution containing metal ions and initially having a pH level of pH 0.5 to pH 3.0, and adding an alkaline solution to the acid treatment solution before the pH level of the acid treatment solution rises to pH 5 to promote the pH rise of the acid treatment solution. This mode is referred to as "inventive mode IIB".

In accordance with further another mode of the second inventive mode group, a process for producing a hydrogen-absorbing alloy electrode is provided which comprises an alloy activation treatment step wherein a hydrogen-absorbing alloy is immersed in an acid treatment solution initially having a pH level of pH 0.5 to pH 3.0, and adding an alkaline solution containing metal ions to the acid treatment solution before the pH level of the acid treatment solution rises to pH 5 to promote the pH rise of the acid treatment solution. This mode is referred to as "inventive mode IIC".

The second inventive mode group described above is significantly different from the first inventive mode group in that the pH rise of the acid treatment solution is promoted by the addition of the alkaline solution at a certain stage of the acid treatment. The inventive modes IIB and IIC in the second inventive mode group are different from the inventive mode IIA in that the acid treatment solution and/or the alkaline solution contain the metal ions. The inventive modes IIB and IIC are different from each other in that the metal ions are added at least to the acid treatment solution in the inventive mode IIB while the metal ions are added at least to the alkaline solution in the inventive mode IIC.

An explanation will hereinafter be given to the importance of the feature of the second inventive mode group (i.e., the pH rise of the acid treatment solution is promoted by the addition of the alkaline solution at a certain stage of the acid treatment) and the importance of the feature of the inventive modes IIB and IIC (i.e., the acid treatment solution contains a metal dissolved therein).

The electrochemical activity of the hydrogen-absorbing-alloy is enhanced by immersing the alloy in a strong acid treatment solution for surface treatment thereof. This is due to the following fact.

When the hydrogen-absorbing alloy is immersed in the strong acid treatment solution, rare earth elements, nickel, cobalt and the like and the oxides and hydroxides thereof react with hydrogen ions in the acid treatment solution, and are leached into the solution in a pH range between pH 0.5 and pH 4. At this time, the pH level of the acid treatment solution gradually rises. In the course of the pH rise, the surface of the alloy is roughened to increase the specific surface area of the alloy because the alloy constituents have different solubilities and leaching rates. At the same time, an isolation layer of nickel and cobalt appears on the alloy surface due to dissolution of the oxides of the rare earth elements and the like. The isolation layer has a high electrochemical activity, which improves the low-temperature discharge characteristic and cycle characteristic of the hydrogen-absorbing alloy electrode in synergy with the increase in the specific surface area of the alloy.

As shown in FIG. 1, however, the pH level of the acid treatment solution does not stop rising at pH 4, but exceeds pH 4. Since the solubilities of the alloy constituents are pH-dependent, the rare earth elements once leached into the treatment solution are deposited as hydroxides in the acid treatment solution to cover the alloy surface when the pH level of the treatment solution reaches around pH 5.

The pH level moderately rises from pH 5 to around a neutral point, and a tight layer of hydroxides of rare earth elements and the like are readily formed on the alloy surface during the pH rise within this pH range. The tight layer formed on the alloy surface prevents an oxygen consumption reaction of the hydrogen-absorbing alloy. Therefore, where the hydrogen-absorbing alloy formed with the tight layer is used as an electrode active substance for a battery, the battery cannot exhibit a satisfactory battery inner pressure characteristic.

In accordance with the second inventive mode group, the addition of the alkaline solution rapidly raises the pH level of the acid treatment solution in which the hydrogen-absorbing alloy is immersed. Therefore, the aforesaid problem is cleared up. More specifically, by rapidly raising the pH level of the acid treatment solution, the metals such as the rare earth elements leached into the acid treatment solution are forced to rapidly react with the alkali (hydroxyl ions) added during the acid treatment thereby to be deposited as hydroxides thereof on the alloy surface in the acid treatment solution. The hydroxide layer thus rapidly deposited is porous and, therefore, does not hinder the oxygen consumption reaction but catalyzes the oxygen consumption reaction.

Therefore, a hydrogen-absorbing alloy electrode employing as its negative electrode active substance the hydrogen-absorbing alloy prepared through the alloy activation treatment process according to the second inventive mode group is excellent in the low-temperature discharge characteristic, the high-rate discharge characteristic and the cycle characteristic, and does not increase the battery inner pressure.

In the alloy activation treatment process according to the second inventive mode group which ensures the aforesaid effects, the acid treatment solution initially has a pH level of pH 0.5 to pH 3.0, and the alkaline solution is added to the acid treatment solution in which the hydrogen-absorbing alloy is immersed before the pH level of the acid treatment solution reaches pH 5, more preferably at a stage where the pH level of the acid treatment solution is not lower than pH 4 and lower than pH 5. It is difficult to prepare an acid treatment solution having an initial pH level of lower than pH 0.5. Use of an acid treatment solution having an initial pH level of higher than pH 3.0 cannot completely remove the oxide and hydroxide films on the alloy surface, failing to ensure satisfactory acid treatment effects. Further, if the alkaline solution is added to the acid treatment solution at a stage where the pH level of the acid treatment solution exceeds pH 5, it is impossible to prevent the formation of the tight hydroxide layer. On the other hand, if the alkaline solution is added to the acid treatment solution at a stage where the pH level of the acid treatment solution is lower than pH 4, the hydrogen-absorbing alloy is not sufficiently acid-treated.

In the alloy activation treatment process according to the second inventive mode group, metal ions may be contained in the acid treatment solution and/or the alkaline solution (the inventive modes IIA and IIB). Where ions of a metal other than the metals to be leached out of the alloy into the acid treatment solution are preliminarily dissolved in the treatment solution, the metal ions are deposited on the alloy surface during the pH rise of the acid treatment solution, so that the resulting alloy has a roughened metal-rich surface. A hydrogen-absorbing alloy electrode employing the hydrogen-absorbing alloy is excellent in the electrochemical characteristics (oxygen consumption characteristic, high-rate discharge characteristic and the like).

Examples of the metal ions include ions of nickel, cobalt, aluminum, copper and bismuth, among which nickel ions, cobalt ions and aluminum ions are preferably used either alone or in combination.

A reason why ions of nickel, cobalt and aluminum are particularly preferred is that these metals have an excellent electric conductivity and supposedly serve to catalyze the oxygen consumption reaction on the alloy surface. Further, nickel, cobalt and aluminum are contained as alloy constituents, thereby producing no adverse effects on the battery reaction.

The metal ions may be contained in either or both of the acid treatment solution and the alkaline solution. Where the metal ions are to be contained either in the acid treatment solution or in the alkaline solution, it is more preferable in terms of the high-rate discharge characteristic that the metal ions are contained in the acid treatment solution. It is further more preferable that the metal ions are contained both in the acid treatment solution and in the alkaline solution, because the high-rate discharge characteristic can further be enhanced.

To allow the metal ions to be contained in the acid treatment solution and/or the alkaline solution, a metal may directly be dissolved in the acid treatment solution or the alkaline solution but, in general, a compound of the metal is used. More specifically, a salt of the metal is used for the acid treatment solution, and a hydroxide of the metal is used for the alkaline solution.

The concentration of the metal ions to be dissolved in the acid treatment solution is not particularly limited. The metal salt is typically dissolved in a concentration of 1 wt % to 5 wt % relative to the acid treatment solution. If the concentration is lower than 1 wt %, a satisfactory effect cannot be obtained. The metal salt cannot readily be dissolved in the acid treatment solution in a concentration of higher than 5 wt % because of the solubility thereof.

It is further preferred to heat the acid treatment solution to dissolve the metal salt therein in a high concentration. This will be described later.

In the alloy activation treatment process according to the second inventive mode group, the alkali is added to the acid treatment solution in a pH adjusting process with the aim of creating conditions suitable for the electrochemical reaction by treating the alloy surface with a strong acid and completing the alloy treatment without impairing the preferable conditions. Therefore, the pH level of the acid treatment solution after the addition of the alkaline solution profoundly influences the electrochemical characteristics of the hydrogen-absorbing alloy. The effects of the addition of the alkali can be maximized in the following manner.

Where the metal ions are contained neither in the acid treatment solution nor in the alkaline solution, the pH level of the acid treatment solution is preferably adjusted to pH 7 to pH 12 by the addition of the alkaline solution. The treatment within this pH range improves both the initial battery inner pressure characteristic and the high-rate discharge characteristic.

Where the metal ions are contained in the acid treatment solution and/or the alkaline solution, the pH level of the acid treatment solution is preferably adjusted to pH 12 or higher by the addition of the alkaline solution. By rapidly raising the pH level of the acid treatment solution to pH 12 or higher by the addition of the alkaline solution under the conditions where a metal other than the alloy constituent metals is dissolved in the acid treatment solution, the high-rate discharge characteristic can effectively be improved without impairing the inner pressure characteristic p at the initial charging. This will become apparent from embodiments of the present invention to be described later.

In the alloy activation treatment process according to the second inventive mode group, the temperature of the treatment solution after the addition of the alkaline solution is preferably 65° C. or higher. By keeping the solution at a temperature of 65° C. or higher, the rate of a reaction between the added alkali (hydroxyl ions) and the metals including the rare earth elements leached into the treatment solution increases, so that a more advantageous porous hydroxide layer can be formed on the alloy surface.

In the alloy activation treatment process according to the second inventive mode group, the metal-containing acid treatment solution and/or the alkaline solution are preferably heated up to 65° C. or higher before use. The acid treatment solution or the alkaline solution heated up to 65° C. or higher is capable of containing therein a greater amount of metal ions thereby to enhance the effect of modifying the alloy surface. Where the alkaline solution contains the metal ions, the heating is particularly effective because metals such as nickel and cobalt have a small solubility in the alkaline solution. In addition, the preheating of the solutions enables the alkali (and the metal added to the alkaline solution) to rapidly react with the metals (the metals including the rare earth metals and the metal added to the acid treatment solution) in the acid treatment solution immediately after the addition of the alkaline solution. Thus, the porous metal-rich layer having an excellent electrochemical activity can be formed on the alloy surface.

Where the hydrogen-absorbing alloy is immersed in the acid treatment solution, the temperature of the acid treatment solution rises to about 30° C. to 35° C. due to chemical reaction heat and the like. To raise the temperature of the acid treatment solution to 65° C. or higher, application of external heat is required. Since it is impossible and unnecessary to raise the temperature of the acid treatment solution to higher than 100° C. under atmospheric pressure, the acid treatment solution is heated up to a temperature of not lower than 65° C. and lower than 100° C. At this time, it is not preferred to boil the acid treatment solution, because evaporation thereof is entailed.

Examples of specific acids to be used for the acid treatment solution according to the second inventive mode group include hydrochloric acid, nitric acid, sulfuric acid, hydrofluoric acid and phosphoric acid. Examples of specific alkalis to be use for the alkaline solution include potassium hydroxide, lithium hydroxide and sodium hydroxide.

The acid treatment according to the second inventive mode group can be applied to the treatment of hydrogen-absorbing alloys, such as of rare earth metal type, a titanium type, a zirconium type and a magnesium type, for use in various alkaline secondary batteries.

(3) Third Inventive Mode Group

In accordance with one mode of the third inventive mode group, a hydrogen-absorbing alloy electrode is provided which comprises as an electrode active substance thereof a hydrogen-absorbing alloy of $AB_x$ type composed of an A-component of a Misch metal and a B-component including at least one of nickel and cobalt, the hydrogen-absorbing alloy including a surface layer formed through a surface treatment with an acid treatment solution and having a thickness of 80 Å measured from the outermost surface thereof and a core portion inside the surface layer, wherein the surface layer has an atomic ratio x of the B-component to the A-component of $3.1 \leq x \leq 6.5$, the core portion has an atomic ratio x of the B-component to the A-component of $4.4 \leq x \leq 5.4$, and the atomic ratio x in the surface layer is different from the atomic ratio x in the core portion. This mode is hereinafter referred to as "inventive mode IIIA".

The hydrogen-absorbing alloy with such a feature has a double-layer structure which includes the core portion and the 80 Å thick surface layer covering the core portion as shown in FIG. 2. This double-layer structure is formed by surface-treating a raw hydrogen-absorbing alloy as a negative electrode active substance material with the acid treatment solution. More specifically, the core portion has a composition ratio B/A (the atomic ratio x) of the B-component to the A-component of $4.4 \leq (B/A) \leq 5.4$, while the surface layer which is modified by the acid treatment has a composition ratio B/A of $3.1 \leq (B/A) \leq 6.5$. Further, the composition ratios in the core portion and in the surface layer are different from each other within the aforesaid ranges.

The hydrogen-absorbing alloy acid-treated to have such a structure has a modified surface state which exhibits a high electrochemical activity. Where an alkaline secondary battery is fabricated by employing the hydrogen-absorbing alloy electrode formed of the hydrogen-absorbing alloy of this structure, the alkaline secondary battery has a large battery capacity at initial charge-discharge cycle, and the increase in the inner pressure of the battery can be suppressed.

Whether or not the hydrogen-absorbing alloy has the surface state properly modified through the acid treatment depends on whether or not the hydrogen-absorbing alloy has the aforesaid double-layer structure. Even if a hydrogen-absorbing alloy has a double-layer structure formed through any other modification methods, the double-layer structure thus formed has no special effect, so that the resulting hydrogen-absorbing alloy does not have a satisfactory electrochemical activity.

The atomic ratio x in the core portion is herein defined as $4.4 \leq x \leq 5.4$. A raw hydrogen-absorbing alloy having an atomic ratio within this range can be modified into a hydrogen-absorbing alloy having an excellent initial discharge characteristic and initial battery inner pressure characteristic. The raw hydrogen-absorbing alloy having such a composition is surface-treated to be formed with a surface layer having an atomic ratio x of $3.1 \leq x \leq 6.5$. Thus, the surface of the raw hydrogen-absorbing alloy is modified into a state which ensures effective absorption of hydrogen and a high electrochemical activity without exerting an adverse effect on the other properties of the hydrogen-absorbing alloy. A very thin surface portion of the raw alloy having a thickness of 80 Å measured from the outermost surface thereof is modified through the acid treatment. The modification of the 80 Å thick surface portion suffices for ensuring a satisfactory effect. If the surface portion of the raw alloy to be modified through the acid treatment has a thickness of greater than 80 Å, the distance from the surface to the core portion of the alloy is increased thereby to reduce the hydrogen-absorbing ability of the hydrogen-absorbing alloy.

Even if the very thin surface portion of the alloy having a thickness of 80 Å measured from the outermost surface thereof has a modified composition, the proportion of the surface layer to the overall alloy is very small, so that the composition ratio (atomic ratio x) of the overall alloy is hardly changed as a whole. If the hydrogen-absorbing alloy has a diameter of 80 μm, for example, the thickness of the surface layer is merely about 1/1000 of the diameter of the core portion. More specifically, the hydrogen-absorbing alloy (the activated hydrogen-absorbing alloy) in accordance with the inventive mode IIIA which comprises the core portion having an atomic ratio x of $4.4 \leq x \leq 5.4$ and the surface layer having an atomic ratio x of $3.1 \leq x \leq 6.5$ with the atomic ratios in the core portion and in the surface layer being different can be obtained by surface-treating a raw hydrogen-absorbing alloy of $AB_x$ type having an atomic ratio x of $4.4 \leq x \leq 5.4$ to modify its surface portion as having an atomic ratio x of $3.1 \leq x \leq 6.5$.

In the inventive mode IIIA, the B-component contained in the Misch metal based hydrogen-absorbing alloy of $AB_x$ type may comprise elements known to be contained in common Misch metal based hydrogen-absorbing alloys as well as nickel and cobalt. Examples of specific elements to be contained in the hydrogen-absorbing alloy include aluminum, manganese, boron, vanadium, tungsten and molybdenum.

The hydrogen-absorbing alloy electrode according to the inventive mode IIIA can be produced through a hydrogen-absorbing alloy electrode production process which includes a first treatment step of surface-treating a raw $AB_x$-type hydrogen-absorbing alloy composed of an A-component of a Misch metal and a B-component including at least one of nickel and cobalt in an acid treatment solution initially having a pH level of pH 0.7 to pH 1.8, and a second treatment step of adding an alkaline solution to the acid treatment solution when the pH level of the acid treatment solution is raised to a pH range between pH 2 and pH 6 by the surface treatment in the first treatment step.

In accordance with this production process, an oxide film and the like on the surface of the hydrogen-absorbing alloy are sufficiently removed in the first treatment step, and the leach-out of the constituents of the hydrogen-absorbing alloy is properly controlled in the second treatment step in which the alkaline solution is added to the acid treatment solution when the pH level of the acid treatment solution is raised to a pH range between pH 2 and pH 6. Thus, the surface layer of the hydrogen-absorbing alloy is modified to have an activity as high as the inside portion of the alloy.

Therefore, reduction in the conductivity on the surface of the hydrogen-absorbing alloy can be prevented, and the activity of the alloy is increased. Where a hydrogen-absorbing alloy electrode is produced by employing the hydrogen-absorbing alloy prepared through this acid treatment method and used as a negative electrode of an alkaline secondary battery such as a nickel-hydrogen secondary battery, efficient hydrogen absorption can be ensured from the initial use of the electrode. More specifically, the secondary battery has a high battery capacity at initial charge-discharge cycle, and the inner pressure rise of the battery can be suppressed.

The raw hydrogen-absorbing alloy is herein treated in the acid treatment solution initially having a pH level of pH 0.7 to pH 1.8. If the initial pH level is lower than pH 0.7, rapid and nonuniform dissolution of the hydrogen-absorbing alloy occurs, so that the resulting hydrogen-absorbing alloy has a deteriorated electrochemical characteristic. On the other hand, if the initial pH level of the acid treatment solution is higher than pH 1.8, the removal of the oxide film and the like on the surface of the hydrogen-absorbing alloy is insufficient.

The alkaline solution has a pH level of pH 14 or higher, and is preferably added to the acid treatment solution in a proportion of 5% to 25% relative to the acid treatment solution. If the alkaline solution is added in a smaller proportion, the leach-out of the constituents of the hydrogen-absorbing alloy cannot properly be controlled. If the alkaline solution is added in excess, a great amount of hydroxides are formed on the surface of the hydrogen-absorbing alloy thereby to reduce the conductivity on the surface of the hydrogen-absorbing alloy.

The acid treatment solution preferably contains at least one of nickel compounds and cobalt compounds. By treating the raw hydrogen-absorbing alloy with the acid treatment solution containing at least one of the nickel compounds and the cobalt compounds, the oxide film and the like are removed from the surface of the hydrogen-absorbing alloy and, at the same time, the leach-out of nickel and cobalt from the surface of the hydrogen-absorbing alloy can be suppressed. In addition, when the pH level of the acid treatment solution rises, nickel and cobalt are deposited on the surface of the hydrogen-absorbing alloy, so that the surface of the hydrogen-absorbing alloy can be modified into nickel- and cobalt-rich state which ensures a high activity.

In accordance with another mode of the third inventive mode group, a hydrogen-absorbing alloy electrode is provided, which comprises as an electrode active substance thereof a Laves-phase hydrogen-absorbing alloy of $AB_x$ type composed of an A-component including at least one of zirconium and titanium and a B-component including at least nickel, the hydrogen-absorbing alloy including a surface layer formed through a surface treatment with an acid treatment solution and having a thickness of 80 Å measured from the outermost surface thereof and a core portion inside the surface layer, wherein the surface layer has an atomic ratio x of the B-component to the A-component of $1.5 \leq x \leq 3.5$, the core portion has an atomic ratio x of the B-component to the A-component of $1.8 \leq x \leq 2.2$, and the atomic ratio x in the surface layer is different from the atomic ratio x in the core portion. This mode is hereinafter referred to as "inventive mode IIIB".

In the inventive mode IIIB, a raw Laves-phase hydrogen-absorbing alloy of $AB_x$ type is treated in the acid treatment solution so that the resulting hydrogen-absorbing alloy has the 80 Å thick surface layer having an atomic ratio x (composition ratio B/A) of the B-component to the A-component of 1.5 to 3.5 and the core portion having an atomic ratio x of $1.8 \leq x \leq 2.2$. The hydrogen-absorbing alloy thus treated has a high activity. Where the hydrogen-absorbing alloy is used for a negative electrode of an alkaline secondary battery such as a nickel-hydrogen secondary battery, efficient absorption of hydrogen gas in the hydrogen-absorbing alloy is ensured from the initial charge-discharge cycle, like the aforesaid Misch metal based hydrogen-absorbing alloy electrode. Therefore, the secondary battery has an increased initial battery capacity, and the inner pressure rise of the battery can be suppressed.

In the inventive mode IIIB, the B-component contained in the Laves-phase hydrogen-absorbing alloy of $AB_x$ type may comprise elements known to be contained in common Laves-phase hydrogen-absorbing alloys as well as nickel. Examples of specific elements to be contained in the hydrogen-absorbing alloy include cobalt, vanadium, manganese, copper and iron.

In the inventive mode IIIB, the atomic ratios x in the core portion and in the surface layer are defined as $1.8 \leq x \leq 2.2$ and $1.5 \leq x \leq 3.5$, respectively, and the surface layer has a thickness of 80 Å. This is based on the same ground as in the inventive mode IIIA. The Laves-phase hydrogen-absorbing alloy of $AB_x$ type composed of the A-component including at least one of zirconium and titanium and the B-component including at least nickel and having the construction defined above has a high electrochemical activity.

As in the inventive mode IIIA, the hydrogen-absorbing alloy (the activated hydrogen-absorbing alloy) in accordance with the inventive mode IIIB which has the core portion having an atomic ratio x of $1.8 \leq x \leq 2.2$ and the surface layer having an atomic ratio x of $1.5 \leq x \leq 3.5$ with the atomic ratios in the core portion and in the surface layer being different can be obtained by acid-treating the raw Laves-phase hydrogen-absorbing alloy of $AB_x$ type having an atomic ratio x of $1.8 \leq x \leq 2.2$ to modify its surface portion as having an atomic ratio x of $1.5 \leq x \leq 3.5$.

The hydrogen-absorbing alloy electrode according to the inventive mode IIIB can be produced in the following manner.

The hydrogen-absorbing alloy electrode is produced through a hydrogen-absorbing alloy electrode production process which includes a first treatment step of surface-treating a Laves-phase hydrogen-absorbing alloy $AB_x$-Type composed of an A-component including at least one of zirconium and titanium and a B-component including at least nickel in an acid treatment solution initially having a pH level of pH 0.7 to pH 1.8, and a second treatment step of adding an alkaline solution to the acid treatment solution when the pH level of the acid treatment solution is raised to a pH range between pH 2 and pH 6 by the surface treatment in the first treatment step.

In this production process, the initial pH of the acid treatment solution is pH 0.7 to pH 1.8, and the alkaline solution is added to the acid treatment solution when the pH level of the acid treatment solution is raised to a pH range between pH 2 and pH 6. This is based on the same ground as in the aforesaid production process for the Misch metal based hydrogen-absorbing alloy electrode.

In this production process, the acid treatment solution may contain ions of at least one of nickel compounds and cobalt compounds. The alkaline solution to be used in the second treatment step has a pH level of pH 14 or higher. The alkaline solution is preferably added to the acid treatment solution in a proportion of 5% to 25% relative to the acid treatment solution. This is based on the same ground as in the aforesaid production process for the Misch metal based hydrogen-absorbing alloy electrode.

(4) Fourth Inventive Mode Group

In accordance with the fourth inventive mode group, a hydrogen-absorbing alloy electrode is provided, which comprises as an electrode active substance thereof a hydrogen-absorbing alloy containing at least nickel and cobalt, the hydrogen-absorbing alloy having on its surface a film of at least one compound selected from the group consisting of an oxide and hydroxide of an alkaline earth metal, an oxide and hydroxide of copper and an oxide and hydroxide of cobalt.

The film formed on the surface of the hydrogen-absorbing alloy serves as a protective film for protecting the alloy surface to suppress oxidation of active sites of nickel, cobalt and the like in the surface layer of the hydrogen-absorbing alloy during an electrode production process. Where a battery is fabricated by employing the hydrogen-absorbing alloy, the film formed on the alloy surface is readily dissolved in an alkaline electrolyte of the battery for removal thereof.

In the alkaline secondary battery fabricated by employing the hydrogen-absorbing alloy with the active sites in the surface layer protected by the film, the film is dissolved in the alkaline electrolyte to expose the active nickel and cobalt sites to the surface of the hydrogen-absorbing alloy. Thus, efficient hydrogen absorption in the hydrogen-absorbing alloy is ensured from the initial charge-discharge cycle, thereby allowing the alkaline secondary battery to have a sufficiently high electrochemical activity from the initial stage.

Where the film is formed of copper oxide, copper hydroxide, cobalt oxide or cobalt hydroxide, the conductivity of the alloy surface is further increased, so that the battery inner pressure characteristic, the initial charge-discharge characteristic and the low-temperature discharge characteristic are improved and the high-rate discharge characteristic (discharge characteristic at a high discharge current) is remarkably improved.

The alkaline earth metal is selected from the group consisting of calcium, strontium, barium, radium, beryllium and magnesium.

If the film formed on the surface of the hydrogen-absorbing alloy is too thin, the film cannot satisfactorily suppress the air oxidation of nickel and cobalt on the alloy surface. Conversely, if the film is too thick, the film remains undissolved in the alkaline electrolyte in the battery, so that the initial activity of the alloy is reduced.

Therefore, the film formed on the surface of the hydrogen-absorbing alloy should have a proper thickness. where the film is formed of the alkaline earth metal oxide or hydroxide, copper oxide or copper hydroxide, the thickness thereof is preferably 15 nm to 50 nm. More preferably, where the film is formed of the alkaline earth metal oxide or hydroxide, the thickness thereof is 20 nm to 45 nm, and where the film is formed of copper oxide or copper hydroxide, the thickness thereof is 20 nm to 42 nm. Further, where the film is formed of cobalt oxide or cobalt hydroxide, the thickness thereof is preferably 5 nm to 50 nm, more preferably 7 nm to 48 nm.

The hydrogen-absorbing alloy electrode according to the fourth inventive mode group can be produced in the following manner.

The hydrogen-absorbing alloy electrode is produced through a hydrogen-absorbing alloy electrode production process, which includes a surface treatment step of immersing a hydrogen-absorbing alloy containing at least nickel and cobalt in a metal ion containing acid treatment solution in which at least one compound selected from the group consisting of salts of an alkaline earth metal, copper and cobalt is dissolved.

Thus, oxides and hydroxides on the alloy surface which may otherwise reduce the activity of the hydrogen-absorbing alloy are dissolved in the acid treatment solution for removal thereof. In the course of the dissolution, the pH level of the acid treatment solution rises but, when the pH level of the acid treatment solution reaches a certain pH range, a metal such as an alkaline earth metal dissolved in the acid treatment solution is deposited on the alloy surface to form a film.

Where the metal salt to be dissolved in the acid treatment solution is an alkaline earth metal salt or a copper salt, the metal salt is added to the acid treatment solution in a proportion of 1 wt % to 5 wt % relative to the acid treatment solution. Where the metal salt to be dissolved in the acid treatment solution is a cobalt salt, particularly cobalt hydroxide, the metal salt is preferably added to the acid treatment solution in a proportion of 0.3 wt % to 1.0 wt % relative to the acid treatment solution. By adding the metal salt in a proportion within the aforesaid range, the film having a proper thickness can be formed on the surface of the hydrogen-absorbing alloy.

The state of the film depends on the initial pH of the acid treatment solution. Therefore, the initial pH should properly be controlled. If the initial pH of the acid treatment solution is too low, a large amount of rare earth elements and the like constituting the alloy are leached out in the solution, so that the concentration of metal ions (metal ions from the alloy) is increased. As a result, when the pH of the acid treatment solution reaches a certain pH level, the metals are deposited in a large amount on the surface of the hydrogen-absorbing alloy to form a firm film thereon. Since hydroxides of rare earth metals and the like are less soluble in the alkaline electrolyte, the initial electrochemical activity of the alloy is deteriorated. On the other hand, if the initial pH level is too high, a satisfactory acid treatment effect cannot be ensured, and the film formed on the surface of the hydrogen-absorbing alloy is thin and weak. Therefore, the oxidation of nickel and cobalt on the surface of the hydrogen-absorbing alloy cannot sufficiently be suppressed.

A preferable initial pH range varies depending on the type of the metal salt to be dissolved in the acid treatment solution. Therefore, it is preferred to variably control the initial pH of the acid treatment solution depending on the type of the metal salt. More specifically, in the case of an alkaline earth metal salt and a copper salt, the initial pH range of the acid treatment solution is preferably between pH 0.7 and pH 2.0. In the case of cobalt hydroxide, the initial pH range of the acid treatment solution is preferably between pH 0.5 and pH 1.5.

Usable as the hydrogen-absorbing alloy for the production of the hydrogen-absorbing alloy electrode are those containing aluminum as well as nickel and cobalt. Where a hydrogen-absorbing alloy containing aluminum is surface-treated with the acid treatment solution described above, aluminum in the alloy is leached into the acid treatment solution, so that the specific surface area of the hydrogen-absorbing alloy is increased and active nickel and cobalt sites are exposed to the surface of the hydrogen-absorbing alloy to a greater extent. In addition, aluminum and cobalt cooperatively form a compound to suppress the air oxidation of the nickel and cobalt active sites. That is, the activity of the hydrogen-absorbing alloy at the initial charge-discharge cycle can further be improved.

BEST MODE FOR CARRYING OUT THE PRESENT INVENTION

Figure 1:
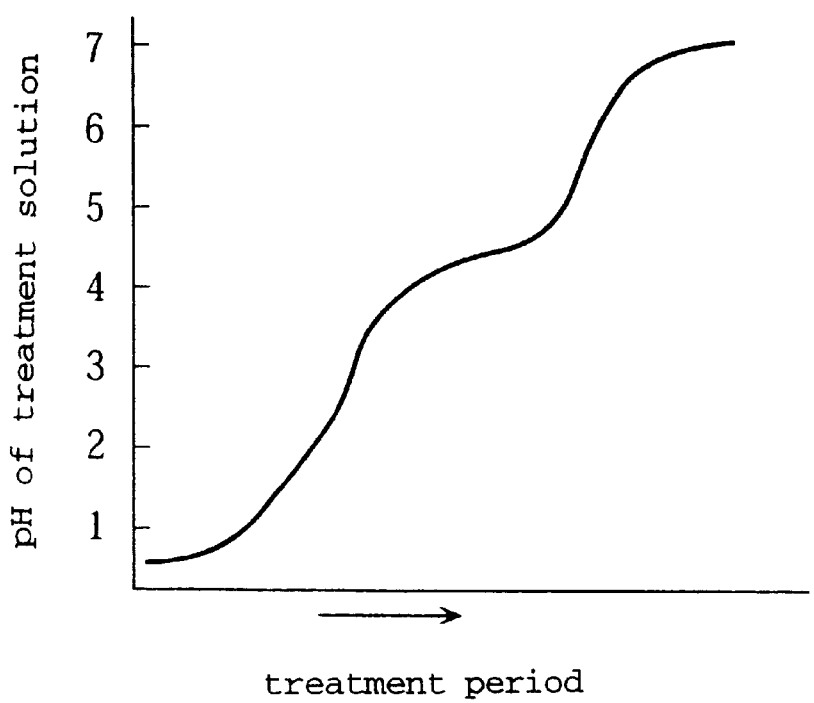
FIG. 1 is a graph showing the pH rise of an acid treatment solution during treatment of a hydrogen-absorbing alloy with the acid treatment solution.

The present invention will hereinafter be described in detail by way of embodiments thereof.

(1) Embodiment According to First Inventive Mode Group

The first inventive mode group will hereinafter be described in detail, and its superior features will be proved by comparing the electrochemical characteristics of a hydrogen-absorbing alloy electrode produced by employing an alloy activation treatment process according to the first inventive mode group and a hydrogen-absorbing alloy electrode produced by a conventional method.

Preparation of Powdery Hydrogen-Absorbing Alloy

A commercially available Misch metal (Mm: a mixture of rare earth metals such as La, Ce, Nd and Pr), nickel (Ni), cobalt (Co), aluminum (Al) and manganese (Mn) were mixed in an element ratio of 1:3.4:0.8:0.2:0.6, and then heat-treated in a high-frequency fusion furnace to prepare a hydrogen-absorbing alloy ingot represented by a composition formula of $MmNi_{3.4}Co_{0.8}Al_{0.2}Mn_{0.6}$. In turn, the hydrogen-absorbing alloy ingot was annealed at 1,000° C. for 10 hours.

Subsequently, 1 Kg of the hydrogen-absorbing alloy ingot was pulverized by means of a ball mill with the use of 1 liter of water. Thus, a powdery hydrogen-absorbing alloy M1 having an average particle diameter of 50 µm was obtained.

Acid Treatment

Five hydrochloric acid aqueous solutions having initial pH levels of pH 0.5, pH 1, pH 2, pH 3 and pH 4, respectively, were prepared, and 1 wt % nickel hydroxide was dissolved in the respective hydrochloric acid solutions. Thus, acid treatment solutions each containing nickel ions (metal-ion-containing acid treatment solutions) were prepared. On the other hand, four hydrochloric acid solutions each having an initial pH level of pH 1 were prepared, in which cobalt hydroxide, copper hydroxide and bismuth hydroxide were respectively dissolved in a concentration of 1 wt %. Thus, four metal-ion-containing acid treatment solution were prepared which respectively contained different metal ions dissolved therein. Further, a metal-ion-containing acid treatment solution containing 1 wt % nickel hydroxide and 1 wt % aluminum hydroxide dissolved in a hydrochloric acid solution having an initial pH level of pH 1 was prepared.

The acid treatment solutions thus prepared are listed in Table 1-1. The term "initial pH level" herein means the pH level of an acid treatment solution before the hydrogen-absorbing alloy was immersed therein (or immediately after the alloy was immersed therein).

Subsequently, samples of the alloy M1 were surface-treated with the respective acid treatment solutions. For the surface treatment, the samples of the alloy M1 were respectively immersed in the acid treatment solutions of a weight equivalent to that of the sample, and the acid treatment solutions were each stirred by means of a stirring mixer until the pH level of the acid treatment solution reached pH 7. The alloy samples respectively surface-treated with the metal-ion-containing acid treatment solutions were rinsed with pure water and dried. Thus, hydrogen-absorbing alloy samples No. 1 to No. 9 according to the first inventive mode group were obtained (see Table 1-1).

As Comparative Examples, a hydrogen-absorbing alloy sample No. 11 was prepared by surface-treating a sample of the alloy with a hydrochloric acid solution containing no metal ion and initially having pH 1, and a hydrogen-absorbing alloy sample No. 12 was prepared by subjecting a sample of the alloy to no acid treatment. Further, a hydrogen-absorbing alloy sample No. 10 (M2) was prepared by plating a sample of the alloy M1 with 3 wt % nickel by an electrolytic plating method without surface-treating the sample with any metal-ion-containing acid treatment solution. This nickel-plated alloy sample was used to verify the effect of metal ions.

In the following description, the alloy samples No. 10 and No. 12 not subjected to the acid treatment are also referred to as "treated alloy samples" for convenience of explanation. In some cases, an acid treatment solution in which a sample of the hydrogen-absorbing alloy is immersed is referred to as "treatment solution".

Electrochemical Characteristic Tests for Treated Alloy Samples

Test cells and nickel-hydrogen secondary batteries were fabricated in the following manner by using the treated alloy samples as their negative electrode active substances for determination of the electrochemical characteristics (high-rate discharge characteristic and cycle characteristic) of the treated alloy samples. The relationship between the electrochemical characteristic and the conditions of the acid treatment solution was clarified on the basis of the results of the determination of the electrochemical characteristics.

Determination of High-Rate Discharge Characteristic

Test cells for use in determination of the high-rate discharge characteristic were fabricated in the following manner.

First, 1 g of each of the powdery alloy samples was mixed with 1.2 g of carbonyl nickel as a conductive agent and 0.2 g of polytetrafluoroethylene powder as a binder, and the resulting mixture was kneaded for preparation of an alloy paste. The alloy paste thus prepared was wrapped with a nickel mesh, and press-formed into a hydrogen-absorbing alloy electrode (negative electrode). The hydrogen-absorbing alloy electrode and a known sintered nickel electrode (positive electrode) having a significantly larger capacity than the negative electrode were placed in a cell. Then, a potassium hydroxide electrolyte was poured in an excess amount into the cell, which was thereafter sealed. Thus, the test cell was fabricated.

The test cell thus fabricated was charged for 8 hours at a current of 50 mA per gram of hydrogen-absorbing alloy (50 mA/g-alloy), rested for one hour, discharged at a current of 200 mA/g-alloy to a discharge termination voltage of 1.0 V. At this time, the discharge capacity (CH) was measured. After the discharging was suspended for one hour to restore the voltage of the test cell, the test cell was discharged at a current of 50 mA/g-alloy to a discharge termination voltage of 1.0 V. At this time, the discharge capacity (CL) was measured. The electrochemical activity (%) of each of the treated alloy samples was calculated from the following formula (1) using CH and CL to determine a high-rate discharge characteristic value.

High-rate discharge characteristic value (activity %)=100×CH/ (CH+CL)     (1)

Determination of Cycle Characteristic

The cycle characteristic was determined with the use of a nickel-hydrogen secondary battery. The nickel-hydrogen secondary battery was fabricated in the following manner. The alloy samples were each mixed with 5 wt % of polytetrafluoroethylene powder as a binder, and the resulting mixture was kneaded for preparation of an alloy paste. The paste thus prepared was applied onto both sides of a collector of a punching metal and pressed for preparation of a hydrogen-absorbing alloy electrode. In turn, the hydrogen-absorbing alloy electrode (negative electrode) and a known sintered nickel electrode (positive electrode) having a lower capacity than the negative electrode were rolled with a separator interposed therebetween to form an electrode roll. After the electrode roll was inserted into a case, a 30 wt % potassium hydroxide aqueous solution was poured therein, and the case was sealed. Thus, a cylindrical nickel-hydrogen secondary battery having a theoretical capacity of 1,000 mAh was fabricated. The construction of the nickel-hydrogen secondary battery is shown in FIG. 8.

Figure 8:
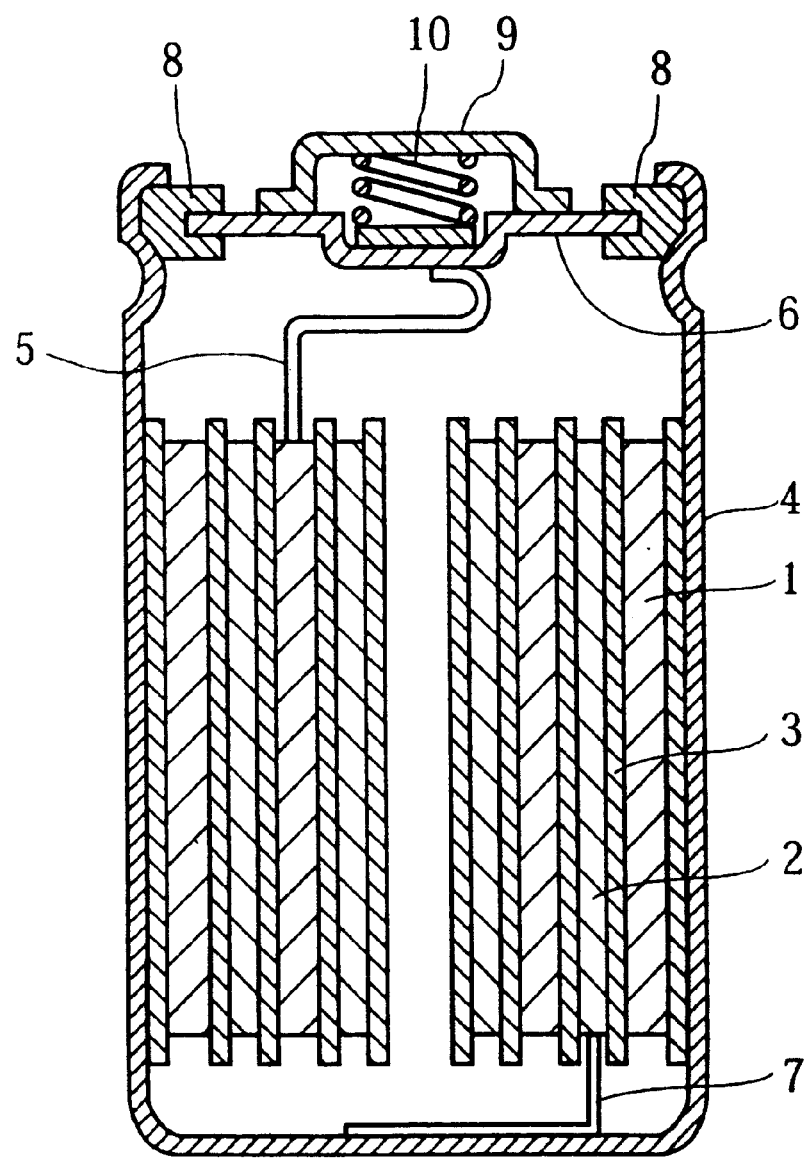
FIG. 8 is a diagram illustrating the construction of a nickel-hydrogen secondary battery used in the first to fourth inventive mode groups.

In FIG. 8, reference numerals 1, 2 and 3 denote the nickel positive electrode, the hydrogen-absorbing alloy negative electrode and the separator, respectively. The nickel positive electrode 1, the hydrogen-absorbing alloy negative electrode 2 and the separator 3 rolled together are housed in the battery case 4, which contains an alkaline electrolyte of the 30 wt % potassium hydroxide solution.

The positive electrode 1 is connected to a positive electrode cap 6 via a positive electrode lead 5, while the negative electrode 2 is connected to the battery case 4 via a negative electrode lead 7. The battery can 4 and the positive electrode cap 6 are electrically isolated from each other by an insulative packing 8. A coil spring 10 is provided between the positive electrode cap 6 and a positive electrode external terminal 9, and adapted to be compressed to release a gas from the battery to the atmosphere when the battery inner pressure abnormally increases.

The nickel-hydrogen secondary battery of this construction was first charged at 100 mA for 16 hours, rested for one hour, discharged at 200 mA to a discharge termination voltage of 1.0 V, and rested for another hour. This charge-discharge cycle was repeated three times at room temperature for activation of the battery. The activated secondary battery was charged at 1,500 mA for 48 minutes, rested for one hour, discharged at 1,500 mA to a discharge termination voltage of 1.0 V, and rested for another hour. This charge-discharge cycle was repeated until the discharge capacity was reduced to 500 mAh or lower, and the number of repeated cycles was determined. Thus, the cycle characteristic of each of the alloy samples was evaluated on the basis of the cycle number, which was regarded as a cycle characteristic value (battery lifetime).

The results of the tests on the respective alloy samples are shown along with the alloy treatment conditions in Table 1-1.

FIG. 1 schematically illustrates a change in the pH level of the treatment solution in the case of the hydrogen absorbing alloy sample (No. 9) treated with the metal-ion-containing acid treatment solution.

TABLE 1-1

| Alloy Sample No. or Test Cell No. | Alloy Treatment Conditions | | | Battery Characteristics | |
|---|---|---|---|---|---|
| | Alloy | Acid Solution (HCl Solution) | | High-Rate Discharge Characteristic (%) | Cycle Characteristic (Cycle Lifetime) |
| | | Initial pH | Metal ions Contained | | |
| 1 | M1 | 0.5 | Nickel | 85 | 1,400 |
| 2 | M1 | 1 | Nickel | 85 | 1,400 |
| 3 | M1 | 2 | Nickel | 83 | 1,300 |
| 4 | M1 | 3 | Nickel | 82 | 1,200 |
| 5 | M1 | 4 | Nickel | 65 | 1,000 |
| 6 | M1 | 1 | Cobalt | 85 | 1,400 |
| 7 | M1 | 1 | Copper | 78 | 1,200 |
| 8 | M1 | 1 | Bismuth | 78 | 1,200 |
| 9 | M1 | 1 | Nickel, Aluminum | 89 | 1,500 |
| 10 | M2** | Not treated | | 60 | 1,000 |
| 11 | M1* | 1 | Not added | 72 | 1,100 |
| 12 | M1 | Not treated | | 60 | 917 |

*Metal ion concentration: 1 wt % metal salt/acid solution
**M2: Prepared by nickel-plating the alloy sample M1.

As apparent from Table 1-1, the alloy samples No. 1 to No. 9 respectively surface-treated with the metal-ion-containing acid treatment solutions according to the present invention were superior in the high-rate discharge characteristic and the cycle characteristic to the alloy samples No. 10 and No. 11 of comparative examples. As apparent from the comparison of the alloy samples No. 1 to No. 5, however, the alloy sample No. 5 treated with the treatment solution having an initial pH level of pH 4 was notably inferior in the high-rate discharge characteristic and the cycle characteristic to the alloy samples No. 1 to No. 4. This indicates that a treatment solution having an initial pH level of pH 3 or lower should be employed.

The comparison of the alloy samples No. 2 and No. 6 to No. 9 which were treated with the treatment solutions having the same initial pH levels but containing different metal ions indicates that the use of the treatment solution containing nickel ions or cobalt ions provides for better battery characteristics than the use of the treatment solution containing copper ions or bismuth ions. The alloy sample No. 9 treated with the treatment solution containing nickel ions and aluminum ions gave much better results. This indicates that the treatment solution preferably contains nickel ions or cobalt ions and, more preferably, along with aluminum ions.

The results will be examined in greater detail.

The comparison between the alloy sample No. 12 not subjected to the surface treatment with an acid treatment solution and the alloy sample No. 11 surface-treated with the acid treatment solution containing no metal ion and the comparison of the alloy sample No. 11 with the alloy samples No. 2 and No. 6 to No. 9 treated with the acid treatment solutions containing metal ions indicate that the surface treatment with an acid treatment solution improves the electrochemical characteristics and that the surface treatment with an acid treatment solution containing metal ions remarkably improves the electrochemical characteristics. On the other hand, the comparison between the alloy sample No. 12 and the nickel-plated alloy sample No. 10 indicates that the battery characteristics cannot be improved by forming a metal layer on the alloy surface by plating.

Where the hydrogen-absorbing alloy is surface-treated with a strong acid treatment solution (having an initial pH level of pH 0.5), the pH level of the acid treatment solution increases with the progress of the surface treatment as shown in FIG. 1. The results shown in Table 1-1 will further be examined in view of this fact.

Where the alloy is surface-treated with an acid treatment solution having a pH level between pH 0.5 and pH 4, the alloy constituents (rare earth metals, nickel, cobalt and the like, and oxides and hydroxides thereof) react with hydrogen ions in the acid treatment solution and leach out of the alloy into the acid treatment solution. Since the alloy constituents have different solubilities and leaching rates, the surface of the alloy is roughened by the leaching of the alloy constituents, thereby increasing the specific surface area of the alloy. Further, an isolated nickel and cobalt layer is formed on the alloy surface by the leaching of the metal oxides and the like.

When the pH level of the acid treatment solution rises to a pH range between pH 4 and pH 6 as the reaction of the alloy constituents with hydrogen ions progresses, the solubilities of the metals are decreased. Therefore, nickel ions and cobalt ions in the acid treatment solution are re-deposited on the roughened surface of the alloy (isolated metal layer). The re-deposition increases the thickness of the isolated metal layer on the alloy surface. As a result, the high-rate discharge characteristic and cycle characteristic of the hydrogen absorbing alloy are improved. This is because the increase in the roughness increases the specific surface area of the alloy and the electrochemical reaction area thereby to improve the oxygen gas absorption ability (which affects the cycle characteristic) and the high-rate discharge characteristic. The isolated metal layer (nickel and cobalt layer) formed on the alloy surface have a high catalytic ability for a gas absorption reaction and a discharge reaction thereby to improve the electrode characteristics.

The metal-ion-containing acid treatment solution according to the first inventive mode group contains ions of a metal such as cobalt or nickel. In the surface treatment with the metal-ion-containing acid treatment solution, a greater amount of metal ions are deposited on the alloy surface in a pH range between pH 4 and pH 6 than in a surface treatment with an acid treatment solution containing no metal ion. The surface treatment with the metal-ion-containing acid treatment solution enhances the roughness of the alloy surface, and thickens the isolated metal layer (catalytic layer). As a result, the high-rate discharge characteristic and the cycle characteristic can remarkably be improved.

This fact is supported by the comparison between the alloy sample No. 12 and the alloy sample No. 10 having a metal layer plated directly on the alloy surface. More specifically, the metal layer formed on the alloy surface by plating has a uniform thickness so that the roughness of the alloy surface is reduced. It is therefore considered that the formation of the metal layer by plating does not improve the high-rate discharge characteristic and the cycle characteristic.

The alloy sample No. 9 surface-treated with the acid treatment solution containing nickel ions and aluminum ions gave the best results. This is because aluminum ions have a pH buffer ability in a pH range between pH 4 and pH 6 thereby to keep the pH level of the acid treatment solution in this pH range for a longer period. Thus, a greater quantity of metal ions are deposited out of the acid treatment solution on the alloy surface. As a result, the isolated metal layer on the alloy surface is thickened, improving the electrochemical characteristics of the hydrogen-absorbing alloy.

Thus, it was proven that the hydrogen-absorbing alloy electrode production process including the alloy activation treatment step in accordance with the first inventive mode group allows the metal preliminarily dissolved in the acid treatment solution to be deposited on the surface of the hydrogen-absorbing alloy in the course of the pH rise of the acid treatment solution during a reaction of alloy constituents with hydrogen ions, so that the hydrogen absorbing alloy has a modified surface suitable for the electrochemical reaction. Therefore, the resulting hydrogen-absorbing alloy electrode is excellent in the high-rate discharge characteristic and the cycle characteristic.

(2) Embodiment According to Second Inventive Mode Group

The second inventive mode group is characterized in that an alkaline solution is added to the acid treatment solution during the acid treatment process. The features of the second inventive mode group will be described by way of comparison between acid treatment processes with and without the addition of an alkali.

EXAMPLES II-1

Examples II-1 are directed to a case where an acid treatment solution containing metal ions is used.

Preparation of Powdery Hydrogen-Absorbing Alloy

A powdery hydrogen-absorbing alloy was prepared in the same manner as that prepared in accordance with the first inventive mode group. More specifically, a commercially available Misch metal (Mm: a mixture of rare earth metals such as La, Ce, Nd and Pr), nickel (Ni), cobalt (Co), aluminum (Al) and manganese (Mn) were mixed together in an element ratio of 1:3.4:0.8:0.2:0.6, and then heat-treated in a high-frequency fusion furnace to prepare a hydrogen-absorbing alloy ingot represented by a composition formula of $MmNi_{3.4}Co_{0.8}Al_{0.2}Mn_{0.6}$. In turn, the hydrogen-absorbing alloy ingot was annealed at 1,000° C. for 10 hours. Subsequently, 1 Kg of the hydrogen-absorbing alloy ingot was pulverized by means of a ball mill with the use of 1 liter of water. Thus, a powdery hydrogen-absorbing alloy having an average particle diameter of 50 $\mu$m was obtained.

Acid Treatment

Four hydrochloric acid aqueous solutions respectively having initial pH levels of pH 0.5, pH 1, pH 2 and pH 3 were prepared as the acid treatment solution (containing no metal ion). A 10-N potassium hydroxide aqueous solution was prepared as the alkaline solution (containing no metal ion). A sample of the powdery hydrogen-absorbing alloy and each of the hydrochloric acid aqueous solutions in a weight ratio of 1:1 were put in a stirring mixer, and stirred therein while the pH level of the acid treatment solution was monitored. When the pH level of the treatment solution reached a predetermined value, a predetermined amount of the potassium hydroxide aqueous solution was added to the treatment solution, and then the resulting mixture was continuously stirred. When the pH level of the treatment solution was stabilized, the stirring was stopped, and the resulting hydrogen-absorbing alloy sample was taken out. The hydrogen-absorbing alloy sample was rinsed with pure water and dried. Thus, treated alloy samples A1 to A12 were prepared. The foregoing operation was performed at room temperature (about 25° C.).

The aforesaid predetermined pH level of the treatment solution was pH 2, pH 4, pH 5 or pH 7 as shown in a column "pH of treatment solution at addition of alkali" in Table 2-1. The aforesaid predetermined amount of the potassium hydroxide solution was an amount such that the pH level of the treatment solution could be adjusted to pH 6, pH 7, pH 10, pH 12 or pH 15 as shown in a column "pH of treatment solution after addition of alkali" in Table 2-1.

The alloy samples A1 to A12 treated under such conditions are listed in Table 2-1. In Examples II-1, the pH levels of the treatment solutions were adjusted by adding the 10-N potassium hydroxide aqueous solution thereto in different amounts. Alternatively, the adjustment of the pH level of the treatment solution may be achieved by using alkaline solutions having different alkalinities.

Prepared as Comparative Examples were an alloy sample X2 (see Table 2-1) which was treated with a hydrochloric acid aqueous solution initially having pH 1 without adding the alkaline solution, and an alloy sample X3 (see Table 2-1) which was not subjected to the acid treatment but treated with a potassium hydroxide solution (alkaline solution) having pH 15. Further, a sample X1 (see Table 2-1) of the powdery hydrogen-absorbing alloy not subjected to the acid treatment was prepared as a reference example.

Electrochemical Characteristic Tests for Treated Alloys

Test cells and nickel-hydrogen secondary batteries were fabricated in the following manner by using the treated alloy samples as their negative electrode active substances, and the initial inner pressure characteristic and high-rate discharge characteristic thereof were determined for examination of the electrochemical characteristics of the treated alloy samples.

Determination of Battery Inner Pressure at Initial Charging

The nickel-hydrogen secondary batteries were used for determination of the battery inner pressure p at the initial charging.

The nickel-hydrogen secondary batteries were each fabricated in the same manner as in the first inventive mode group. More specifically, the alloy samples were each mixed with 5 wt % of polytetrafluoroethylene powder as a binder, and the resulting mixture was kneaded for preparation of an alloy paste. The paste thus prepared was applied onto both sides of a collector of a punching metal and pressed for preparation of a hydrogen-absorbing alloy electrode. In turn, the hydrogen-absorbing alloy electrode (negative electrode) and a known sintered nickel electrode (positive electrode) having a lower capacity than the negative electrode were rolled with a separator interposed therebetween to form an electrode roll. After the electrode roll was inserted into a case, a 30 wt % potassium hydroxide aqueous solution was poured therein, and the case was sealed. Thus, a cylindrical nickel-hydrogen secondary battery having a theoretical capacity of 1,000 mAh was fabricated.

The nickel-hydrogen secondary battery thus fabricated was charged at 1,000 mA for 60 minutes and, at this time, a battery inner pressure p was measured. The battery inner pressure at the initial charging represented by the battery inner pressure p is herein termed "inner pressure P characteristic". It is noted that "initial inner pressure T characteristic" to be described later in the third and fourth inventive mode groups and the "inner pressure P characteristic" were determined under different conditions.

Determination of High-Rate Discharge Characteristic

Test cells for use in determination of the high-rate discharge characteristic were fabricated in the same manner as in the first inventive mode group.

More specifically, 1 g of each of the powdery alloy samples was mixed with 1.2 g of carbonyl nickel as a conductive agent and 0.2 g of polytetrafluoroethylene powder as a binder and, the resulting mixture was kneaded for preparation of an alloy paste. The alloy paste thus prepared was wrapped with a nickel mesh, and press-formed into a hydrogen-absorbing alloy electrode (negative electrode). The hydrogen-absorbing alloy electrode and a known sintered nickel electrode (positive electrode) having a significantly larger capacity than the negative electrode were placed in a cell. Then, a potassium hydroxide electrolyte was poured in an excess amount into the cell, which was thereafter sealed. Thus, the test cell was fabricated.

The test cell thus fabricated was charged for 8 hours at a current of 50 mA per gram of hydrogen-absorbing alloy (50 mA/g-alloy), rested for one hour, discharged at a current of 200 mA/g-alloy to a discharge termination voltage of 1.0 V. At this time, the discharge capacity (CH) was measured. After the discharging was suspended for one hour to restore the voltage of the test cell, the test cell was discharged at a current of 50 mA/g-alloy to a discharge termination voltage of 1.0 V. At this time, the discharge capacity (CL) was measured. The electrochemical activity (%) of each of the treated alloy samples was calculated from the following formula (1) using CH and CL to determine a high-rate discharge characteristic value.

$$\text{High-rate discharge characteristic value (activity \%)} = 100 \times CH/(CH+CL) \quad (1)$$

Figure 3:
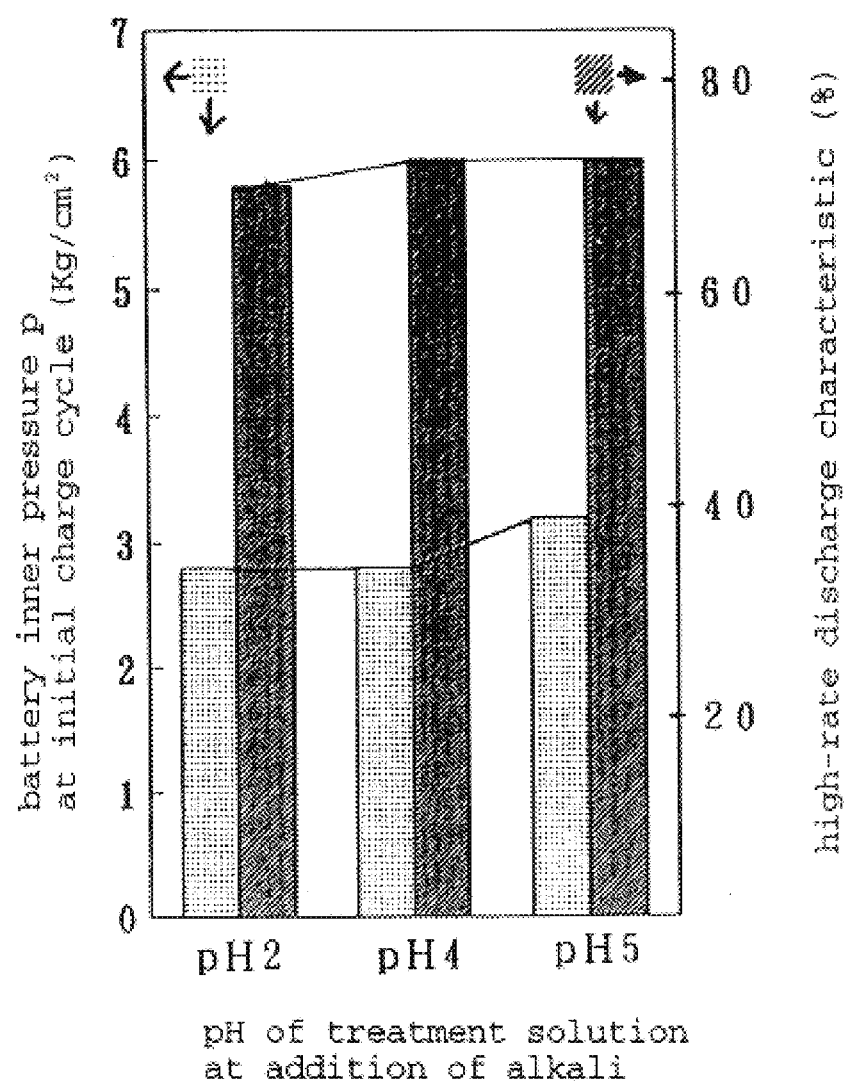
FIG. 3 is a graph illustrating the relationship of the pH level of a treatment solution at addition of an alkaline solution versus the initial inner pressure p and high-rate discharge characteristic of a battery in accordance with the second inventive mode group.
Figure 4:
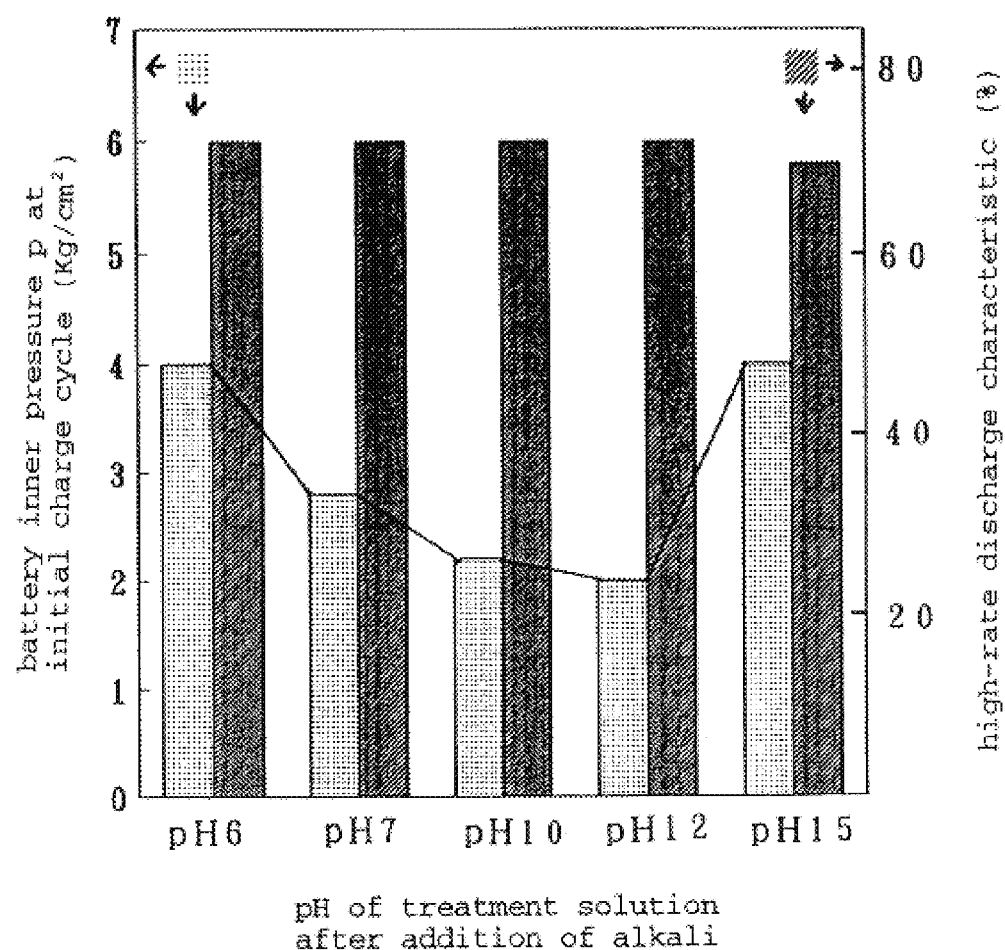
FIG. 4 is a graph illustrating the relationship of the pH level of the treatment solution after the addition of the alkaline solution versus the initial inner pressure p and high-rete discharge characteristic of the battery in accordance with the second inventive mode group.

The test results are shown in Table 2-1 along with the alloy treatment conditions. A graph indicating the relationships of the pH level of the treatment solution at the addition of the alkaline solution versus the inner pressure p at the initial charging and the high-rate discharge characteristic are shown in FIG. 3, which are the results of the tests on the alloy samples A5, A2 and A6 treated with the acid treatment solutions initially having pH 1, then having pH 2, pH 4 and pH 5, respectively, at the addition of the alkaline solution, and having pH 7 after the addition of the alkaline solution. A graph indicating the relationships of the pH level of the treatment solution after the addition of the alkaline solution versus the inner pressure p at the initial charging and the high-rate discharge characteristic are shown in FIG. 4, which are the results of the tests on the alloy samples A7, A2, A8, A9 and A10 treated with the acid treatment solutions initially having pH 1, then having pH 4 at the addition of the alkaline solution, and having pH 6, pH 7, pH 10, pH 12 and pH 15, respectively, after the addition of the alkaline solution.

TABLE 2-1

| Alloy Sample No. or Test Cell No. | Alloy Treatment Conditions | | | Battery Characteristics | |
|---|---|---|---|---|---|
| | Initial pH of Acid Treatment Solution | pH of Treatment Solution at Addition of Alkali | pH of Treatment Solution After Addition of Alkali | Inner Pressure P at Initial Charging kg/cm$^2$ | High-Rate Discharge Characteristics % |
| A1  | 0.5 | 4 | 7  | 2.8 | 72 |
| A2  | 1   | 4 | 7  | 2.8 | 72 |
| A3  | 2   | 4 | 7  | 2.8 | 70 |
| A4  | 3   | 4 | 7  | 2.8 | 67 |
| A5  | 1   | 2 | 7  | 2.8 | 70 |
| A6  | 1   | 5 | 7  | 3.2 | 72 |
| A7  | 1   | 4 | 6  | 4.0 | 72 |
| A8  | 1   | 4 | 10 | 2.2 | 72 |
| A9  | 1   | 4 | 12 | 2.0 | 72 |
| A10 | 1   | 4 | 15 | 4.0 | 70 |
| A11 | 1   | 7 | 10 | 5.0 | 72 |
| A12 | 1   | 7 | 15 | 4.5 | 72 |
| X1  | —   | — | —  | 2.0 | 60 |
| X2  | 1   | — | —  | 5.3 | 72 |
| X3  | —   | 7 | 15 | 2.0 | 60 |

—; not treated

Correlation (I) Between Treatment Conditions and Electrochemical Characteristics The comparison between the alloy sample X1 (not subjected to the acid treatment) and the alloy sample X2 (subjected to the acid treatment without the addition of the alkaline solution in accordance with the comparative example) shown in Table 2-1 indicates that the hydrogen-absorbing alloy subjected to the acid treatment had an improved high-rate discharge characteristic but a deteriorated inner pressure P characteristic. Further, the results of the tests on the alloy samples X2 and A1 to A12 (subjected to the acid treatment with the addition of the alkaline solution) indicate that the addition of the alkaline solution to the treatment solution in the midst of the acid treatment improved the inner pressure P characteristic.

This fact will be described in greater detail. In the case of the alloy samples A1 to A4 treated with the acid treatment solutions initially having pH 0.5, pH 1, pH 2 and pH 3, respectively, then having pH 4 at the addition of the alkaline solution, and having pH 7 after the addition of the alkaline solution, the battery inner pressure at the initial charging was 2.8 kg/cm$^3$ independently of the initial pH level. On the other hand, the high-rate discharge characteristic was deteriorated with the increase in the initial pH of the treatment solution. The comparison between the alloy samples A5, A2 and A6 (see FIG. 3) treated with the treatment solutions initially having pH 1, then having pH 2, pH 4 and pH 5, respectively, at the addition of the alkaline solution and having pH 7 after the addition of the alkaline solution indicates that the treatment with the acid treatment solution having pH 5 at the addition of the alkaline solution provided for a higher battery inner pressure P at the initial charging than the treatment with the acid treatment solution having pH 2 or pH 4 at the addition of the alkaline solution. In the case of the alloy samples A1 and A12 treated with the acid treatment solutions having pH 7 at the addition of the alkaline solution, the battery inner pressure p at the initial charging is still higher.

These results indicate that the acid treatment solution preferably has an initial pH level of pH 0.5 to pH 3 and the alkaline solution is preferably added to the acid treatment solution before the pH level of the acid treatment solution rises to pH 5, more preferably at a stage where the treatment solution has a pH level of not lower than 4 and lower than 5.

FIG. 4 shows the results of the tests on the alloy samples A7, A2, A8, A9 and A10 treated with the acid treatment solutions initially having pH 1, then having pH 4 at the addition of the alkaline solution and having pH 6, pH 7, pH 10, pH 12 and pH 15, respectively, after the addition of the alkaline solution. In FIG. 4, the high-rate discharge characteristic s w ere substantially the same even if the pH levels of the treatment solutions after the addition of the alkaline solution were different within a pH range between pH 6 and pH 12, while the battery inner pressures P at the initial charging were higher in the case where the pH levels of the treatment solutions were lower than pH 6 or higher than pH 12. This indicates that the alkaline solution is preferably added to the acid treatment solution when the pH level of the treatment solution is between pH 7 an d pH 12.

The comparison between the alloy sample X1 not subjected to any treatment and the alloy sample X3 treated only with the alkaline solution indicates that the treatment only with the alkaline solution did not improve the battery inner pressure P characteristic nor the high-rate discharge characteristic. This means that the aforesaid effects can be ensured only by adding the alkaline solution in the midst of the acid treatment.

EXAMPLES II-2

An explanation will be given to Examples II-2 in which acid treatment solutions each containing metal ions were used. Examples II-2 are substantially the same as in Examples II-1 except that the acid treatment solutions each contained metal ions. Therefore, only features different from those of Examples II-1 will be described.

First, four hydrochloric acid aqueous solutions having different initial pH levels and a 10-N potassium hydroxide aqueous solution were prepared which were respectively used as acid treatment solutions and an alkaline solution containing no metal ion. Further, predetermined metal ions were dissolved in portions of the respective solutions to prepare metal-ion-containing acid treatment solutions and a metal-ion-containing alkaline solution. More specifically, chlorides of nickel, cobalt, copper, bismuth and aluminum were respectively dissolved in an amount of 5 wt % in portions of the hydrochloric acid aqueous solutions for preparation of five types of metal-ion-containing acid treatment solutions. Hydroxides of the aforesaid metals were respectively dissolved in portions of the aforesaid potassium hydroxide solution to saturation at room temperature (about 25° C.) for preparation of five types of metal-ion-containing alkaline solutions (see Tables 2-2 and 2-3).

Hydrogen-absorbing alloy samples were treated with the respective acid treatment solutions having pH 4 at the addition of the alkaline solutions and having pH 7 after the addition of the alkaline solutions under various treatment conditions. Thus, alloy samples B1 to B8 (treated by using the metal-ion-containing acid treatment solutions), alloy samples C1 to C8 (treated by using the metal-ion-containing alkaline solution) and alloy samples D1 to D 12 (treated by using both the metal-ion-containing acid treatment solutions and the metal-ion-containing alkaline solutions) were prepared (see Tables 2-2 and 2-3).

Alloy samples E1 to E3 were prepared by treating hydrogen-absorbing alloy samples with the acid treatment solutions having pH 10, pH 12 and pH 15, respectively, after the addition of the alkaline solution in order to determine the optimum pH level of a treatment solution to be raised by the addition of the alkaline solution.

An alloy sample F1 was prepared in substantially the same manner as the alloy sample D2 (prepared at room temperature), except that the nickel-containing acid treatment solution and the nickel-containing alkaline solution heated at 65° C. were used, in order to determine the influence of the temperature of the acid treatment solution on the electrochemical characteristics of the alloy sample.

The electrochemical characteristics of the respective treated alloys were determined in the same manner as in Examples II-1. The results are shown in Tables 2-2 and 2-3 along with the treatment conditions.

TABLE 2-2

| Alloy Sample No. or Test Cell No. | Alloy Treatment Conditions ||| Battery Characteristics ||
|---|---|---|---|---|---|
| | Acid Solution || Alkaline Solution | Inner Pressure | High-Rate |
| | Initial pH | Metal Ions Dissolved | Metal Ions Dissolved | pH After Addition Thereof | P at Initial Charging $kg/cm^2$ | Discharge Characteristics % |
| B1 | 0.5 | Ni | — | 7 | 2.0 | 87 |
| B2 | 1 | Ni | — | 7 | 2.0 | 87 |
| B3 | 2 | Ni | — | 7 | 2.0 | 87 |
| B4 | 3 | Ni | — | 7 | 2.0 | 83 |
| B5 | 1 | Co | — | 7 | 2.0 | 87 |
| B6 | 1 | Cu | — | 7 | 2.0 | 80 |
| B7 | 1 | Bi | — | 7 | 2.0 | 80 |
| B8 | 1 | Al | — | 7 | 2.0 | 89 |
| C1 | 0.5 | — | Ni | 7 | 2.0 | 80 |
| C2 | 1 | — | Ni | 7 | 2.0 | 80 |
| C3 | 2 | — | Ni | 7 | 2.0 | 80 |
| C4 | 3 | — | Ni | 7 | 2.0 | 78 |
| C5 | 1 | — | Co | 7 | 2.0 | 80 |
| C6 | 1 | — | Cu | 7 | 2.0 | 75 |
| C7 | 1 | — | Bi | 7 | 2.0 | 75 |
| C8 | 1 | — | Al | 7 | 2.0 | 80 |

—: not contained

TABLE 2-3

| Alloy Sample No. or Test Cell No. | Alloy Treatment Conditions ||| Battery Characteristics ||
|---|---|---|---|---|---|
| | Acid Solution || Alkaline Solution | Inner Pressure | High-Rate |
| | Initial pH | Metal Ions Dissolved | Metal Ions Dissolved | pH After Addition Thereof | P at Initial Charging $kg/cm^2$ | Discharge Characteristics % |
| D1 | 0.5 | Ni | Ni | 7 | 2.0 | 89 |
| D2 | 1 | Ni | Ni | 7 | 2.0 | 89 |
| D3 | 2 | Ni | Ni | 7 | 2.0 | 87 |
| D4 | 3 | Ni | Ni | 7 | 2.0 | 87 |
| D5 | 1 | Co | Ni | 7 | 2.0 | 89 |
| D6 | 1 | Cu | Ni | 7 | 2.0 | 82 |
| D7 | 1 | Bi | Ni | 7 | 2.0 | 82 |
| D8 | 1 | Al | Ni | 7 | 2.0 | 90 |
| D9 | 1 | Ni | Co | 7 | 2.0 | 89 |
| D10 | 1 | Ni | Cu | 7 | 2.0 | 80 |
| D11 | 1 | NI | Bi | 7 | 2.0 | 80 |
| D12 | 1 | Ni | Al | 7 | 2.0 | 90 |
| E1 | 1 | Ni | Ni | 10 | 2.0 | 89 |
| E2 | 1 | Ni | Ni | 12 | 2.0 | 91 |
| E3 | 1 | Ni | Ni | 15 | 2.0 | 91 |
| F1* | 1 | Ni | Ni | 7 | 2.0 | 91 |
| X1 | — | — | — | — | 2.0 | 60 |

TABLE 2-3-continued

| | Alloy Treatment Conditions | | | | Battery Characteristics | |
|---|---|---|---|---|---|---|
| Alloy | Acid Solution | | Alkaline Solution | | Inner Pressure | High-Rate |
| Sample No. or Test Cell No. | Initial pH | Metal Ions Dissolved | Metal Ions Dissolved | pH After Addition Thereof | P at Initial Charging kg/cm² | Discharge Characteristics % |
| X2 | 1 | — | — | — | 5.3 | 72 |
| X3 (A2) | 1 | — | — | 7 | 2.8 | 72 |
| X4 | 1 | Ni | — | — | 5.3 | 85 |

—: Not contained,
*Temperature of treatment solution was 65° C. after addition of alkaline solution.

Correlation (II) Between Treatment Conditions and Electrochemical Characteristics In the case of the alloy samples A1 to A4 treated with the treatment solutions containing no metal ion in Examples II-1 (Table 2-1), the battery inner pressures p at the initial discharging were 2.8 Kg/cm². On the other hand, in the case of the alloy samples B1 to B4 (Table 2-2) subjected to the treatments in which only the acid treatment solutions contained Ni ions, the alloy samples C1 to C4 (Table 2-2) subjected to the treatments in which only the alkaline solutions contained Ni ions, and the alloy samples D1 to D4 (Table 2-3) subjected to the treatments in which both the acid treatment solutions and the alkaline solutions contained Ni ions, the battery inner pressures p at the initial charging were 2.0 Kg/cm². This indicates that the battery inner pressure P characteristic can be improved by the treatment with an acid treatment solution in which a metal other than the alloy constituent metals is dissolved.

Figure 5:
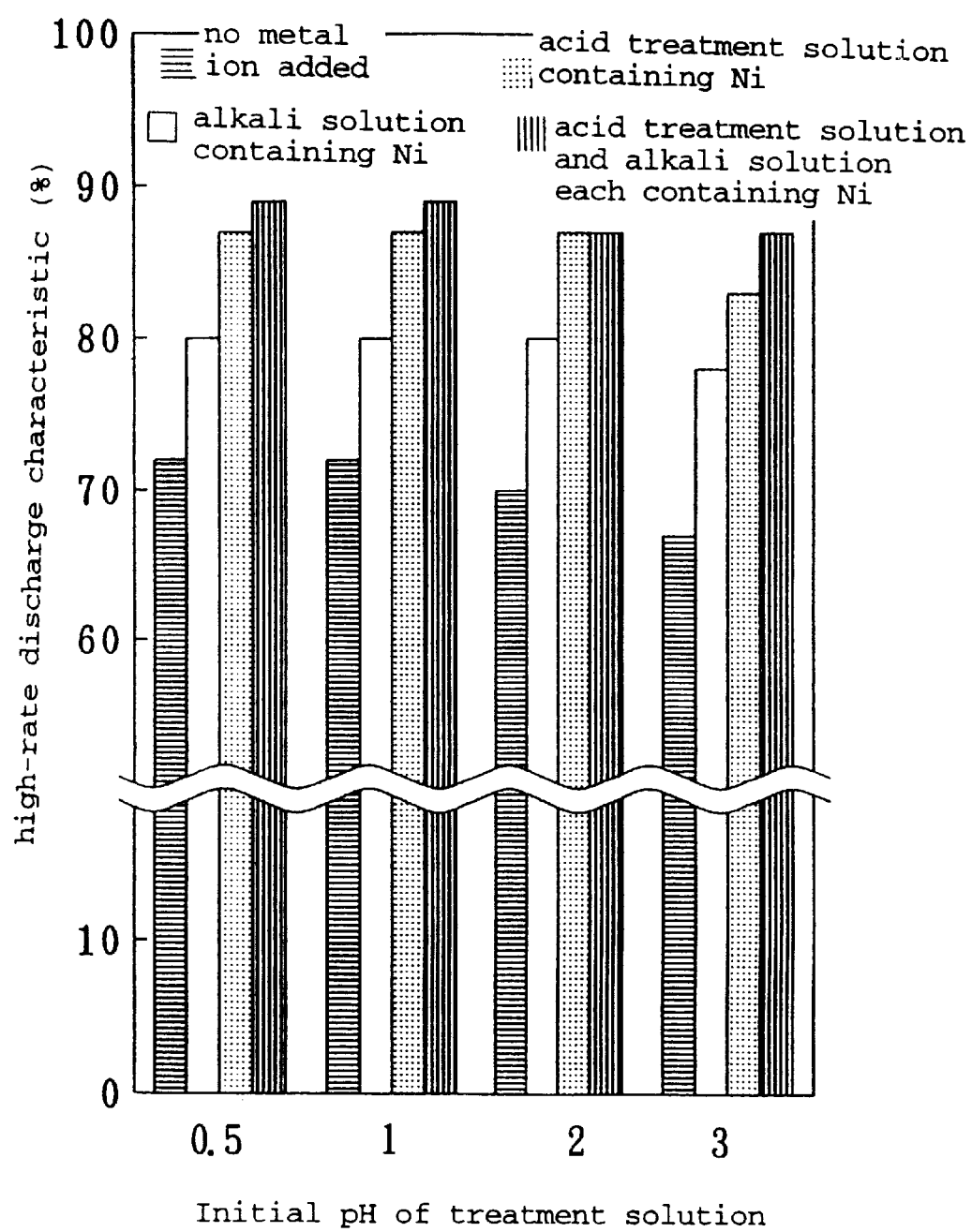
FIG. 5 is a graph which proves the effectiveness of an alloy activation treatment process employing a treatment solution containing metal ions in accordance with the second inventive mode group.

The treatment in the presence of a metal other than the alloy constituent metals remarkably improves the high-rate discharge characteristic. As apparent from a graph in FIG. 5 prepared on the basis of the results of the tests on the alloy samples A1 to D4, however, the improvement degree of the high-rate discharge characteristic is not constant unlike the battery inner pressure P characteristic, but varies depending on the treatment conditions. More specifically, the improvement degree of the high-rate discharge characteristic is expressed as follows:

(Treatment in which both acid solution and alkaline solution contain Ni ions)
≧(Treatment in which only acid solution contains Ni ions)
>(Treatment in which only alkaline solution cantains Ni ions)
>(Treatment in which neither acid solution nor alkaline solution contain Ni ions)

Thus, it was proven that the treatment with an acid treatment solution in which a metal other than the alloy constituent metals is dissolved (or added) improves both the battery inner pressure P characteristic and the high-rate discharge characteristic, and that the improvement degree of the high-rate discharge characteristic depends on which of the acid treatment solution and the alkaline solution contains metal ions. Where the metal ions are to be contained in the acid treatment solution or in the alkaline solution, it is preferable to add the metal ions to the acid treatment solution. It is more preferable to add the metal ions to both the acid treatment solution and the alkaline solution.

Figure 6:
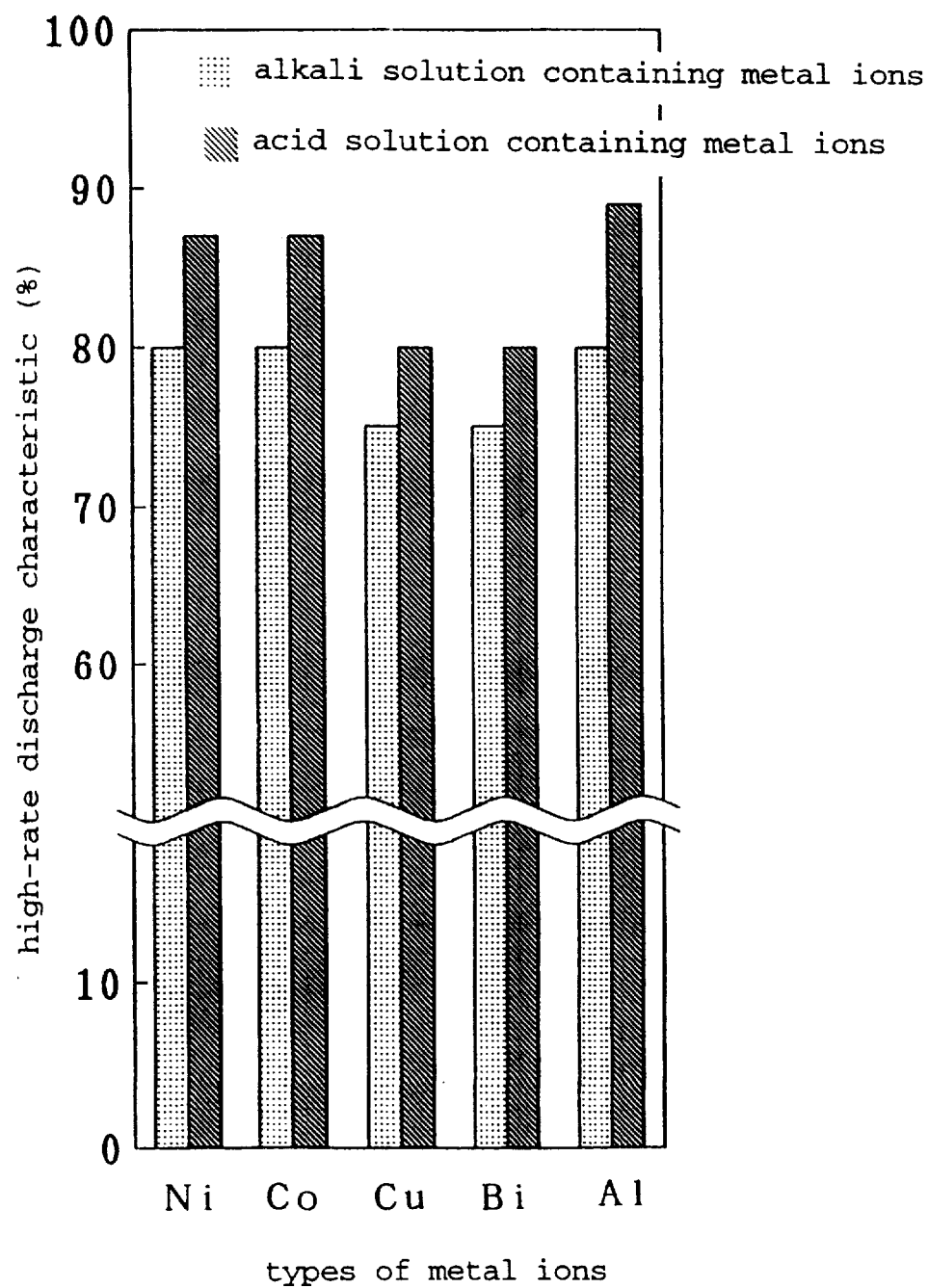
FIG. 6 is a graph illustrating the relationship of the type of metal ions versus the high-rate discharge characteristic in accordance with the second inventive mode group.

Next, an explanation will be given to the correlation between the type of the metal ions and the electrochemical characteristic. FIG. 6 is a graph prepared on the basis of the results of the tests on the alloy samples B2 and B5 to B8, C2 and C5 to C8 which were treated with the treatment solutions containing different types of metal ions (with the other treatment conditions being the same). As apparent from FIG. 6, the improvement degree of the high-rate discharge characteristic shows the same tendency as described above, i.e., (Treatment in which only acid solution contains Ni ions)> (Treatment in which only alkaline solution contains Ni ions). On the other hand, the improvement degree of the high-rate discharge characteristic depends on the type of the metal ions, i.e., Al≧Ni=Co>Cu=Bi. Therefore, Al, Ni or Co ions are preferable as the metal ions, and Al ions are more preferable.

The conclusion that Al, Ni or Co ions are preferable and Al ions are more preferable is supported by the results of the tests on the alloy samples D2 and D5 to D12 subjected to the treatments in which metal ions were contained both in the acid treatment solution and in the alkaline solution (the other treatment conditions were the same). More specifically, the combinations of Ni—Ni (D2), Co—Ni (D5), Al—Ni (D8), Ni—Co (D9) and Ni—Al (D12) ensure a more excellent high-rate discharge characteristic (see Table 2-3).

Figure 7:
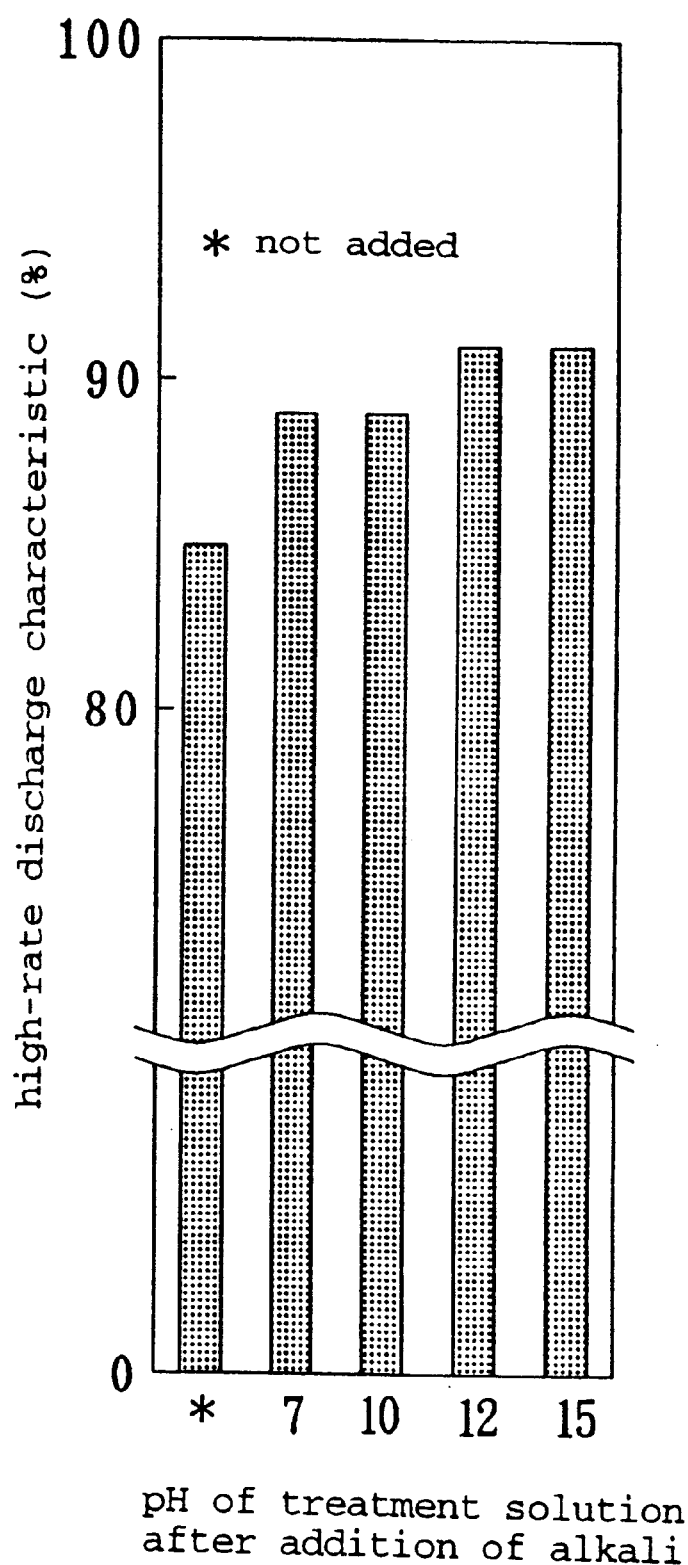
FIG. 7 is a graph illustrating the relationship of the pH level of a treatment solution after addition of an alkaline solution containing metal ions versus the high-rate discharge characteristic in accordance with the second inventive mode group.

FIG. 7 is a graph illustrating the relationship of the pH level of an acid treatment solution after the addition of an alkaline solution and the high-rate discharge characteristic in the case where both the acid treatment solution and the alkaline solution contained metal ions. The graph was prepared on the basis of the results of the tests on the alloy samples E1 to E3 and X4 shown in Table 2-3. As apparent from FIG. 7, the pH level of the treatment solution is preferably raised to pH 7 or higher, more preferably pH 12 or higher by adding a proper amount of the alkaline solution to the treatment.

The comparison between the alloy sample F1 treated at 65° C. and the alloy sample D2 treated at room temperature indicates that the alloy sample F1 provided for a more excellent high-rate discharge characteristic than the alloy sample D2. As described above, the alloy samples F1 and D2 were subjected to the treatment at different temperatures. Therefore, the difference in the high-rate discharge characteristic is attributable to the difference in the temperature of the treatment solution. That is, the treatment with a treatment solution at 65° C. or higher further improves the high-rate discharge characteristic.

As described above, the acid treatment process according to the second inventive mode group is characterized in that the hydrogen-absorbing alloy is continuously treated with the acid treatment solution in a pH range between pH 0.5 and pH 4 in which the acid effectively acts on the surface of the alloy, and the alkaline solution is added to the acid treatment solution to rapidly raise the pH of the treatment solution to a neutral or alkaline level at a stage where the pH of the treatment solution reaches a pH level of pH 4 to pH 5 at which the acid treatment becomes less effective and the formation of a tight hydroxide layer on the alloy surface would be started. This prevents the formation of the tight layer of hydroxides of rare earth elements on the alloy surface. Therefore, a hydrogen-absorbing alloy electrode employing the hydrogen-absorbing alloy thus treated ensures an excellent low-temperature discharge characteristic and high-rate discharge characteristic, while preventing the deterioration in the battery inner pressure P characteristic.

Where ions of a metal such as aluminum, cobalt or nickel are added to the acid solution and/or the alkaline solution in this acid treatment, the metal is deposited on the alloy surface during the pH rise of the acid treatment solution to modify the alloy surface into a configuration (or state) suitable for the electrochemical reaction. Thus, the electrochemical characteristics such as the battery inner pressure P characteristic, the low-temperature discharge characteristic, the high-rate discharge characteristic and the cycle characteristic.

With such effects, an alkaline secondary battery employing a hydrogen-absorbing alloy electrode prepared through the hydrogen-absorbing alloy electrode production process according to the second inventive mode group exhibits a high performance unavailable in the prior art.

(3) Embodiment According to Third Inventive Mode Group

An embodiment according to the third inventive mode group relates to a hydrogen-absorbing alloy electrode (inventive mode IIIA) which employs as an electrode active substance thereof a hydrogen-absorbing alloy of $AB_x$ type comprising an A-component of a Misch metal and a B-component including at least one of nickel and cobalt, and a hydrogen-absorbing alloy electrode (inventive mode IIIB) which employs as an electrode active substance a Laves-phase hydrogen-absorbing alloy of $AB_x$ type comprising an A-component including at least one of zirconium and titanium and a B-component including at least nickel. Like the first and second mode groups, the third inventive mode group will hereinafter be described in detail by way of examples thereof.

EXAMPLES III-1

Examples III-1 relate to the inventive mode IIIA of the third inventive mode group.

First, 99.9% pure Ni, Co, Al and Mn and a Misch metal (Mm: a mixture of rare earth metals) were mixed together in proper molar ratios and the resulting mixtures were melted in an arc melt furnace in an argon atmosphere. Then, the resulting melts were allowed to stand for cooling thereof. Thus, ingots of hydrogen-absorbing alloys of $AB_x$ type represented by a composition formula of $Mm(Ni_{0.6}Co_{0.2}Al_{0.1}Mn_{0.1})_x$ wherein x is 4.0, 4.2, 4.4, 4.8, 5.0, 5.4, 5.6 and 6.0, respectively, as shown in Table 3-1 were obtained.

The respective Mm-based hydrogen-absorbing alloy ingots were mechanically pulverized in an inert atmosphere. Thus, powdery hydrogen-absorbing alloys having an average particle diameter of 80 μm were obtained.

Samples of each of the powdery hydrogen-absorbing alloys thus obtained were respectively immersed in hydrochloric acid aqueous solutions (acid treatment solutions) each having pH 0.7 for 15 minutes and, when the pH levels of the hydrochloric acid solutions (the pH levels of the treatment solutions) reached pH 4, a potassium hydroxide aqueous solution (alkaline solution) having pH 14 or higher and a specific gravity of 1.30 was added to the respective treatment solutions in proportions of 0%, 1%, 3%, 5%, 10%, 15%, 20%, 25% and 30% for surface treatment of the hydrogen-absorbing alloy samples (see Table 3-1). A proportion of 0% means that the alkaline solution was not added to the treatment solution for the surface treatment of the hydrogen-absorbing alloy sample.

The powdery hydrogen-absorbing alloy samples were each examined by means of a scanning transmission electron microscope and an energy-dispersive X-ray analyzer for determination of the composition of a surface portion thereof having a thickness of 80 Å as measured from the outermost surface thereof. Then, the composition ratio B/A of the B-component of Ni, Co, Al and Mn to the A-component of Mm was determined. The results of the examination are shown in Table 3-1. The composition ratio B/A corresponds to x in $AB_x$.

TABLE 3-1

| Proportion of KOH Solution to Acid Solution | Composition B/A after Treatment × before Treatment | | | | | | | |
|---|---|---|---|---|---|---|---|---|
| (%) | 4.0 | 4.2 | 4.4 | 4.8 | 5.0 | 5.4 | 5.6 | 6.0 |
| 1 | 2.9 | 2.7 | 7.9 | 9.3 | 9.5 | 9.7 | 2.9 | 2.3 |
| 3 | 2.6 | 2.9 | 7.9 | 9.2 | 9.1 | 9.2 | 2.9 | 2.7 |
| 5 | 2.2 | 2.6 | 6.5 | 6.4 | 6.4 | 6.5 | 2.8 | 2.9 |
| 10 | 2.5 | 2.5 | 5.5 | 6.2 | 6.1 | 6.2 | 2.8 | 2.5 |
| 15 | 1.9 | 1.9 | 4.9 | 5.9 | 5.1 | 5.5 | 2.8 | 1.9 |
| 20 | 1.7 | 1.9 | 4.4 | 5.7 | 4.1 | 5.3 | 2.8 | 2.5 |
| 25 | 1.3 | 1.9 | 3.1 | 3.4 | 3.9 | 4.2 | 2.8 | 2.4 |
| 30 | 0.8 | 1.7 | 2.9 | 2.6 | 2.9 | 2.5 | 2.8 | 1.9 |
| 0 | 6.8 | 7.7 | 8.6 | 9.4 | 9.8 | 8.4 | 8.8 | 9.1 |

Figure 2:
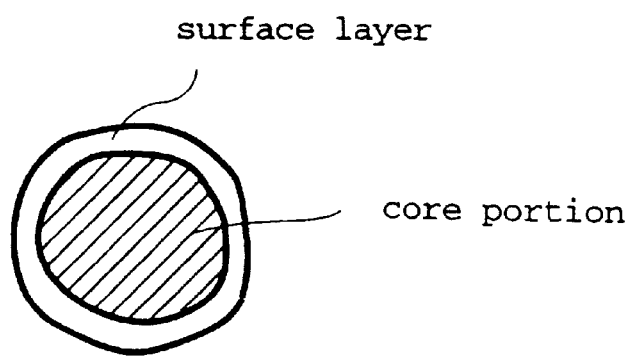
FIG. 2 is a schematic diagram illustrating a double-layer structure of a hydrogen-absorbing alloy in accordance with the present invention.

As can be understood from Table 3-1, the Mm-based hydrogen-absorbing alloy samples having a composition formula of $Mm(Ni_{0.6}Co_{0.2}Al_{0.1}Mn_{0.1})_x$ wherein x is 4.4 to 5.4 and treated with the acid treatment solutions to which the alkaline solution was added in proportions of 5 to 25% each had a surface portion having a composition ratio B/A of 3.1 to 6.5, and satisfied the requirements defined in the appended claim 24. These powdery hydrogen-absorbing alloys each had a core portion and a surface layer (having a thickness of 80 Å as measured from the outermost surface thereof) as shown in FIG. 2, and the composition ratio B/A of the core portion was different from the composition ratio B/A of the surface layer.

In turn, 100 parts by weight of each of the hydrogen-absorbing alloy samples shown in Table 3-1 was mixed with 20 parts by weight of a 5 wt % polyethylene oxide aqueous solution as a binder for preparation of an alloy paste. The alloy paste was applied on both sides of a collector of a nickel-plated punching metal and dried at room temperature. Then, the resulting collector was cut into a predetermined size. Thus, hydrogen-absorbing alloy electrodes were prepared.

Subsequently, a nickel-hydrogen secondary battery having a battery capacity of 1,000 mAh was fabricated by employing each of the hydrogen-absorbing alloy electrodes thus prepared as its negative electrode, a common sintered nickel electrode as its positive electrode and an alkali-resistant nonwoven fabric as its separator. The battery had the construction shown in FIG. 8.

The nickel-hydrogen secondary battery was charged at a charge current of 200 mA (0.2 C.) at room temperature for 6 hours, and then discharged at a discharge current of 200 mA (0.2 C.). Thus, the initial discharge capacity of the nickel-hydrogen secondary battery was measured.

The results are shown in Table 3-2.

Further, the inner pressure of the nickel-hydrogen secondary battery was measured while the battery was charged at 1,000 mA (1 C.) at room temperature. At this time, a charging time t required for the battery inner pressure to reach 10 kgf/cm² was measured. The charging time t of the nickel-hydrogen secondary battery was shown as an initial inner pressure T characteristic in Table 3-3. The initial inner pressure T characteristic was determined by measuring charging times of four nickel-hydrogen secondary batteries for each type and averaging the charging times.

TABLE 3-2

| Proportion of KOH Solution to Acid Solution | Initial Discharge Capacity (mAh) x before Treatment | | | | | | | |
|---|---|---|---|---|---|---|---|---|
| (%) | 4.0 | 4.2 | 4.4 | 4.8 | 5.0 | 5.4 | 5.6 | 6.0 |
| 1 | 490 | 570 | 790 | 830 | 810 | 795 | 690 | 545 |
| 3 | 480 | 580 | 790 | 820 | 800 | 790 | 670 | 550 |
| 5 | 470 | 570 | 790 | 820 | 810 | 790 | 660 | 540 |
| 10 | 490 | 570 | 790 | 830 | 810 | 795 | 690 | 545 |
| 15 | 480 | 580 | 790 | 820 | 800 | 790 | 670 | 550 |
| 20 | 490 | 570 | 790 | 830 | 810 | 795 | 690 | 545 |
| 25 | 480 | 580 | 770 | 820 | 800 | 790 | 670 | 550 |
| 30 | 440 | 520 | 700 | 775 | 780 | 750 | 620 | 510 |
| 0 | 490 | 570 | 790 | 830 | 810 | 795 | 690 | 545 |

TABLE 3-3

| Proportion of KOH Solution to Acid Solution | Initial Inner Pressure T Characteristic (min.) x before Treatment | | | | | | | |
|---|---|---|---|---|---|---|---|---|
| (%) | 4.0 | 4.2 | 4.4 | 4.8 | 5.0 | 5.4 | 5.6 | 6.0 |
| 1 | 75 | 95 | 125 | 130 | 135 | 125 | 95 | 90 |
| 3 | 75 | 95 | 125 | 130 | 135 | 125 | 95 | 90 |
| 5 | 90 | 95 | 140 | 140 | 145 | 140 | 95 | 90 |
| 10 | 95 | 95 | 145 | 140 | 150 | 140 | 95 | 90 |
| 15 | 100 | 100 | 150 | 145 | 150 | 140 | 95 | 90 |
| 20 | 95 | 95 | 145 | 150 | 145 | 140 | 95 | 90 |
| 25 | 95 | 95 | 140 | 140 | 145 | 140 | 95 | 90 |
| 30 | 75 | 95 | 120 | 125 | 125 | 125 | 95 | 90 |
| 0 | 75 | 95 | 125 | 130 | 135 | 125 | 95 | 90 |

As apparent from the results shown in Tables 3-2 and 3-3, the nickel-hydrogen secondary batteries fabricated by employing as their negative electrode active substances the Mm-based hydrogen-absorbing alloy samples each having a composition formula of $Mm(Ni_{0.6}Co_{0.2}Al_{0.1}Mn_{0.1})_x$ wherein x is 4.4 to 5.4, and having a 80 Å thick surface layer with a composition ratio B/A of 3.1 to 6.5 formed through the acid treatment with the acid treatment solution (hydrochloric acid solution) to which the potassium hydroxide aqueous solution (alkaline solution) having pH 14 and a specific gravity of 1.30 was added in a proportion of 5% to 25% in the midst of the acid treatment layer each had a higher initial discharge capacity and a more excellent initial battery inner pressure T characteristic (a longer charging time t) than the nickel-hydrogen secondary batteries fabricated by employing the hydrogen-absorbing alloys not satisfying a B/A requirement of 3.1 to 6.5.

It was proven that the hydrogen-absorbing alloy electrodes employing as their negative electrode active substances the hydrogen-absorbing alloys satisfying the aforesaid requirement suppress the generation of a gas at the initial charging and ensure satisfactory discharge capacities from the initial charge-discharge cycle.

EXAMPLES III-2

Examples III-2 relate to the inventive mode IIIB of the third inventive mode group.

First, 99.9% pure Zr, Ni, V and Mn were mixed together in proper molar ratios, and the resulting mixtures were melted in an arc melt furnace in an argon atmosphere. Then, the resulting melts were allowed to stand for cooling thereof. Thus, ingots of Laves-phase hydrogen-absorbing alloys of $AB_x$ type represented by a composition formula of $Zr(Ni_{0.6}V_{0.2}Mn_{0.2})_x$ wherein x is 1.6, 1.7, 1.8, 1.9, 2.0, 2.2, 2.3 and 2.5, respectively, as shown in Table 3-4 were obtained.

The respective hydrogen-absorbing alloy ingots were mechanically pulverized in an inert atmosphere. Thus, powdery hydrogen-absorbing alloys having an average particle diameter of 80 μm were obtained.

Samples of each of the powdery hydrogen-absorbing alloys thus obtained were respectively immersed in hydrochloric acid aqueous solutions (acid treatment solutions) each having pH 0.7 for 15 minutes and, when the pH levels of the acid treatment solutions reached about pH 4, a potassium hydroxide aqueous solution (alkaline solution) having pH 14 or higher and a specific gravity of 1.30 was added to the respective treatment solutions in proportions of 0%, 1%, 3%, 5%, 10%, 15%, 20%, 25% and 30% for surface treatment of the hydrogen-absorbing alloy samples (see Table 3-4). A proportion of 0% means that the alkaline solution was not added to the treatment solution for the surface treatment of the hydrogen-absorbing alloy sample.

The powdery hydrogen-absorbing alloy samples were each examined in the same manner as in Examples III-1 for determination of the composition of a surface portion thereof having a thickness of 80 Å as measured from the outermost surface thereof. Then, the composition ratio B/A of the B-component of Ni, V and Mn to the A-component of Zr was determined. The results of the examination are shown in Table

TABLE 3-4

| Proportion of KOH Solution to Acid Solution | Composition B/A after Treatment x before Treatment | | | | | | | |
|---|---|---|---|---|---|---|---|---|
| (%) | 1.6 | 1.7 | 1.8 | 1.9 | 2.0 | 2.2 | 2.3 | 2.5 |
| 1 | 1.1 | 0.9 | 4.8 | 4.7 | 4.2 | 4.2 | 1.1 | 1.3 |
| 3 | 1.1 | 1.2 | 4.3 | 4.4 | 4.1 | 4.1 | 1.2 | 1.2 |
| 5 | 1.2 | 1.1 | 3.5 | 3.4 | 3.4 | 3.5 | 1.1 | 1.3 |
| 10 | 1.1 | 1.2 | 2.5 | 3.2 | 3.4 | 3.5 | 0.9 | 1.3 |
| 15 | 1.1 | 1.3 | 2.1 | 3.4 | 3.1 | 3.4 | 1.1 | 1.3 |
| 20 | 1.2 | 1.2 | 2.2 | 1.7 | 2.1 | 3.3 | 1.1 | 1.2 |
| 25 | 1.1 | 1.1 | 1.5 | 1.7 | 1.9 | 3.2 | 1.1 | 1.3 |
| 30 | 0.8 | 1.2 | 0.9 | 0.6 | 1.1 | 1.2 | 1.2 | 0.9 |
| 0 | 4.3 | 4.7 | 4.8 | 4.7 | 4.2 | 4.2 | 4.5 | 4.4 |

As can be understood from Table 3-4, the Laves-phase hydrogen-absorbing alloy samples having a composition formula of $Zr(Ni_{0.6}V_{0.2}Mn_{0.2})_x$ wherein x is 1.8 to 2.2 and treated with the acid treatment solutions to which the alkaline solution was added in proportions of 5% to 25% each had a surface portion having a composition ratio B/A of 1.5 to 3.5, and satisfied the requirements defined in the appended claim 28. These powdery hydrogen-absorbing alloy samples each had a double-layer structure consisting of a core portion and a surface layer having different composition ratios B/A like the powdery hydrogen-absorbing alloys prepared in Examples III-1.

In turn, hydrogen-absorbing alloy electrodes were prepared in the same manner as in Examples III-1 by employing the hydrogen-absorbing alloy samples thus treated. Then, nickel-hydrogen secondary batteries each having a battery capacity of 1,000 mAh were fabricated by employing the hydrogen-absorbing alloy electrodes thus prepared as their negative electrodes. These batteries had the construction shown in FIG. 8.

The nickel-hydrogen secondary batteries were examined in the same manner as in Examples III-1 for determination of the initial discharge capacity and initial battery inner pressure T characteristic thereof. The results are shown in Table 3-6.

TABLE 3-5

| Proportion of KOH Solution to Acid Solution | Initial Discharge Capacity (mAh) × before Treatment | | | | | | | |
|---|---|---|---|---|---|---|---|---|
| (%) | 1.6 | 1.7 | 1.8 | 1.9 | 2.0 | 2.2 | 2.3 | 2.5 |
| 1 | 290 | 460 | 640 | 650 | 750 | 670 | 475 | 330 |
| 3 | 290 | 470 | 650 | 650 | 745 | 675 | 480 | 330 |
| 5 | 290 | 470 | 670 | 660 | 750 | 680 | 480 | 325 |
| 10 | 290 | 470 | 670 | 660 | 750 | 680 | 480 | 330 |
| 15 | 290 | 470 | 670 | 660 | 745 | 680 | 475 | 330 |
| 20 | 290 | 470 | 670 | 665 | 750 | 675 | 480 | 335 |
| 25 | 290 | 470 | 670 | 660 | 745 | 675 | 475 | 330 |
| 30 | 220 | 425 | 600 | 730 | 690 | 600 | 425 | 300 |
| 0 | 290 | 460 | 640 | 650 | 750 | 670 | 475 | 330 |

TABLE 3-6

| Proportion of KOH Solution to Acid Solution | Initial Inner Pressure T Characteristic (min.) × before Treatment | | | | | | | |
|---|---|---|---|---|---|---|---|---|
| (%) | 1.6 | 1.7 | 1.8 | 1.9 | 2.0 | 2.2 | 2.3 | 2.5 |
| 1 | 75 | 80 | 105 | 120 | 120 | 110 | 95 | 90 |
| 3 | 75 | 85 | 110 | 120 | 125 | 115 | 95 | 90 |
| 5 | 75 | 85 | 140 | 140 | 145 | 140 | 95 | 90 |
| 10 | 75 | 85 | 145 | 140 | 150 | 140 | 90 | 90 |
| 15 | 75 | 80 | 145 | 145 | 145 | 140 | 95 | 90 |
| 20 | 75 | 85 | 145 | 145 | 145 | 145 | 95 | 90 |
| 25 | 75 | 80 | 140 | 140 | 145 | 140 | 95 | 90 |
| 30 | 65 | 70 | 120 | 125 | 125 | 125 | 80 | 75 |
| 0 | 70 | 85 | 105 | 125 | 120 | 115 | 95 | 80 |

As apparent from the results shown in Tables 3-5 and 3-6, the nickel-hydrogen secondary batteries fabricated by employing as their negative electrode active substances the Laves-phase hydrogen-absorbing alloys each having a composition formula of $Zr(Ni_{0.6}V_{0.2}Mn_{0.2})_x$ wherein x is 1.8 to 2.2. and having a 80 Å thick surface layer with a composition ratio B/A of 1.5 to 3.5 formed through the surface treatment with the hydrochloric acid solution to which the alkaline solution was added in a proportion of 5% to 25% each had a higher initial discharge capacity and a more excellent initial battery inner pressure T characteristic (a longer charging time t) than the nickel-hydrogen secondary batteries fabricated by employing the hydrogen-absorbing alloys not satisfying a B/A requirement of 1.5 to 3.5.

It was proven that the hydrogen-absorbing alloy electrodes employing as their negative electrode active substances the Laves-phase hydrogen-absorbing alloys satisfying the aforesaid requirement suppress the generation of a gas at the initial charging and ensure satisfactory discharge capacities from the initial charge-discharge cycle.

EXAMPLES III-3 TO III-5 AND COMPARATIVE EXAMPLE III-1

Examples III-3 to III-5 relate to a case where a Misch metal based hydrogen-absorbing alloy is treated with a metal-ion-containing acid treatment solution prepared by dissolving a metal salt in an acid solution.

First, 99.9% pure Ni, Co, Al and Mn and a Misch metal (Mm: a mixture of rare earth metals) were mixed together in a proper molar ratio and the resulting mixture was melted in an arc melt furnace in an argon atmosphere as in Examples III-1. Then, the resulting melt was allowed to stand for cooling thereof. Thus, an ingot of an Mm-base hydrogen-absorbing alloy represented by a composition formula of $MmNi_{3.1}Co_{1.0}Mn_{0.5}Al_{0.4}$ was obtained.

The Mm-base hydrogen-absorbing alloy ingot was mechanically pulverized in an inert atmosphere. Thus, a powdery hydrogen-absorbing alloy having an average particle diameter of 80 μm was obtained.

Samples of the powdery hydrogen-absorbing alloy thus obtained were respectively surface-treated with metal-ion-containing acid treatment solutions. More specifically, a metal-containing acid treatment solution having pH 0.7 and prepared by dissolving 0.2 wt % of cobalt chloride $CoCl_2$ in a hydrochloric acid aqueous solution was used in Example III-3. A metal-containing acid treatment solution having pH 0.7 and prepared by dissolving 0.2 wt % of nickel chloride $NiCl_2$ in a hydrochloric acid aqueous solution was used in Example III-4. A metal-containing acid treatment solution having pH 0.7 and prepared by dissolving 0.1 wt % of cobalt chloride $CoCl_2$ and 0.1 wt % of nickel chloride $NiCl_2$ in a hydrochloric acid aqueous solution was used in Example III-5. The alloy samples were respectively immersed in these metal-containing acid treatment solutions for 15 minutes and, when the pH levels of the treatment solutions reached about pH 4, a potassium hydroxide aqueous solution (alkaline solution) having pH 14 or higher and a specific gravity of 1.30 was added to the respective treatment solutions in a proportion of 10% for surface treatment of the alloy samples.

In Comparative Example III-1, a sample of the powdery hydrogen-absorbing alloy was immersed in a hydrochloric acid aqueous solution having pH 0.7 and containing neither cobalt chloride $CoCl_2$ nor nickel chloride $NiCl_2$ for 15 minutes for surface treatment thereof.

The powdery hydrogen-absorbing alloy samples thus treated were filtered out with suction, rinsed with water and dried. Thus, acid-treated hydrogen-absorbing alloy samples were obtained.

The hydrogen-absorbing alloy samples thus obtained were each analyzed by the X-ray photo-electron spectrophotometry (XPS) for surface analysis thereof, and the ratio of the amount of hydroxides to the amount of metals (hydroxides/metals) on the alloy surface was determined. The results are shown in Table 3-7.

In turn, hydrogen-absorbing alloy electrodes were prepared in the same manner as in Examples III-1 by employing the hydrogen-absorbing alloy samples thus obtained. Then, nickel-hydrogen secondary batteries each having a battery capacity of 1,000 mAh (and having the construction shown in FIG. 8) were fabricated by employing the hydrogen-absorbing alloy electrodes thus prepared as their negative electrodes.

The nickel-hydrogen secondary batteries were examined in the same manner as in Examples III-1 for determination of the initial discharge capacity and initial battery inner pressure T characteristic thereof. The results are shown in Table 3-7.

TABLE 3-7

|  | Surface Composition of Hydrogen-Absorbing Alloy (Hydroxides/metals) | Initial Discharge Capacity (mAh) | Inner Pressure T Characteristic (min) |
| --- | --- | --- | --- |
| Ex. III-3 | ≈1 | 830 | 150 |
| Ex. III-4 | ≈1 | 830 | 150 |
| Ex. III-5 | ≈1 | 840 | 150 |
| Com. Ex. III-1 | <<1 | 810 | 135 |

As apparent from Table 3-7, the alloy samples (Examples III-3 to III-5) obtained by treating the Mm-based hydrogen-absorbing alloy with the metal-ion-containing acid treatment solutions containing cobalt chloride $CoCl_2$ and/or nickel chloride $NiCl_2$ had a greater amount of hydroxides on their surfaces than the alloy sample (Comparative Example III-1) treated with the hydrochloric acid solution containing neither cobalt chloride $CoCl_2$ nor nickel chloride $NiCl_2$.

Further, it was proven that the nickel-hydrogen secondary batteries employing the hydrogen-absorbing alloy electrodes of Examples III-3 to III-5 formed of the Mm-based hydrogen-absorbing alloys treated with the metal-ion-containing acid treatment solution containing cobalt chloride $CoCl_2$ and/or nickel chloride $NiCl_2$ exhibited a higher initial discharge capacity and a more excellent battery initial inner pressure T characteristic (a longer charging time t) than the nickel-hydrogen secondary battery employing the hydrogen-absorbing alloy electrode of Comparative Example III-1 formed of the Mm-based hydrogen-absorbing alloy treated with the hydrochloric acid solution containing neither cobalt chloride $CoCl_2$ nor nickel chloride $NiCl_2$.

EXAMPLES III-6 TO III-8 AND COMPARATIVE EXAMPLE III-2

Examples III-6 to III-8 relate to a case where a Laves-phase hydrogen-absorbing alloy is treated with a metal-ion-containing acid treatment solution prepared by dissolving a metal salt in an acid solution.

First, 99.9% pure Zr, Ni, V and Mn were mixed together in a proper molar ratio and the resulting mixture was melted in an arc melt furnace in an argon atmosphere as in Examples III-2. Then, the resulting melt was allowed to stand for cooling thereof. Thus, an ingot of a Laves-phase hydrogen-absorbing alloy represented by a composition formula of $ZrNi_{1.0}V_{0.7}Mn_{0.3}$ was obtained.

The hydrogen-absorbing alloy ingot thus obtained was mechanically pulverized in an inert atmosphere. Thus, a powdery hydrogen-absorbing alloy having an average particle diameter of 80 μm was obtained.

Samples of the powdery hydrogen-absorbing alloy thus obtained were respectively immersed for 15 minutes in a metal-containing acid treatment solution having pH 0.7 and prepared by dissolving 0.2 wt % of cobalt chloride $CoCl_2$ in a hydrochloric acid aqueous solution in Example III-6, in a metal-containing acid treatment solution having pH 0.7 and prepared by dissolving 0.2 wt % of nickel chloride $NiCl_2$ in a hydrochloric acid aqueous solution in Example III-7, and in a metal-containing acid treatment solution having pH 0.7 and prepared by dissolving 0.1 wt % of cobalt chloride $CoCl_2$ and 0.1 wt % of nickel chloride $NiCl_2$ in a hydrochloric acid aqueous solution in Example III-8 and, when the pH levels of the treatment solutions rose to about pH 4, a potassium hydroxide aqueous solution (alkaline solution) having pH 14 or higher and a specific gravity of 1.30 was added to the respective treatment solutions in a proportion of 10% for surface treatment of the alloy samples.

In Comparative Example III-2, a sample of the powdery hydrogen-absorbing alloy was immersed in a hydrochloric acid aqueous solution having pH 0.7 and containing neither cobalt chloride $CoCl_2$ nor nickel chloride $NiCl_2$ for 15 minutes for surface treatment thereof.

The powdery hydrogen-absorbing alloy samples thus treated were filtered out with suction, rinsed with water and dried. Thus, acid-treated hydrogen-absorbing alloy samples were obtained.

The hydrogen-absorbing alloy samples thus obtained were each analyzed by the X-ray photo-electron spectrophotometry (XPS) for surface analysis thereof, and the ratio of the amount of hydroxides to the amount of metals (hydroxides/metals) on the alloy surface was determined. The results are shown in Table 3-8.

In turn, hydrogen-absorbing alloy electrodes were prepared in the same manner as in Examples III-1 by employing the hydrogen-absorbing alloy samples thus obtained. Then, nickel-hydrogen secondary batteries each having a battery capacity of 1,000 mAh (and having the construction shown in FIG. 8) were fabricated by employing the hydrogen-absorbing alloy electrodes thus prepared as their negative electrodes.

The nickel-hydrogen secondary batteries were examined in the same manner as in Examples III-1 for determination of the initial discharge capacity and initial battery inner pressure T characteristic thereof. The results are shown in Table 3-8.

TABLE 3-8

|  | Surface Composition of Hydrogen-Absorbing Alloy (Hydroxides/metals) | Initial Discharge Capacity (mAh) | Inner Pressure T Characteristic (min) |
| --- | --- | --- | --- |
| Ex. III-6 | ≈1 | 790 | 135 |
| Ex. III-7 | ≈1 | 800 | 140 |
| Ex. III-8 | ≈1 | 795 | 140 |
| Com. Ex. III-2 | <<1 | 750 | 125 |

As apparent from the results shown in Table 3-8, the alloy samples (Examples III-6 to III-8) obtained by treating the Laves-phase hydrogen-absorbing alloy with the metal-ion-containing acid treatment solution containing cobalt chloride $CoCl_2$ and/or nickel chloride $NiCl_2$ had a greater amount of hydroxides on their surfaces than the alloy sample (Comparative Example III-2) treated with the hydrochloric acid solution containing neither cobalt chloride $CoCl_2$ nor nickel chloride $NiCl_2$.

Further, it was proven that the nickel-hydrogen secondary batteries employing the hydrogen-absorbing alloy electrodes of Examples III-6 to III-8 formed of the Laves-phase hydrogen-absorbing alloys treated with the metal-ion-containing acid treatment solutions containing cobalt chloride $CoCl_2$ and/or nickel chloride $NiCl_2$ exhibited a higher initial discharge capacity and a more excellent battery initial inner pressure T characteristic (a longer charging time t) than the nickel-hydrogen secondary battery employing the hydrogen-absorbing alloy electrode of Comparative Example III-2 formed of the Laves-phase hydrogen-absorbing alloy treated with the hydrochloric acid solution containing neither cobalt chloride $CoCl_2$ nor nickel chloride $NiCl_2$.

EXAMPLES III-9

In Examples III-9, samples of a powdery hydrogen-absorbing alloy represented by a composition formula of $MmNi_{3.1}Co_{1.0}Mn_{0.5}Al_{0.4}$ were immersed in metal-ion-containing acid treatment solutions each having pH 0.7 and containing 0.2 wt % of nickel chloride $NiCl_2$ for 15 minutes as in Example III-4 and, when the pH levels of the metal-ion-containing treatment solutions reached pH levels shown in Table 3-9, a potassium hydroxide aqueous solution (alkaline solution) having pH 14 or higher and a specific gravity of 1.30 was added to the respective treatment solutions in a proportion of 10% for surface treatment of the alloy samples. The powdery hydrogen-absorbing alloy samples thus treated were filtered out with suction, rinsed with water and dried.

In turn, hydrogen-absorbing alloy electrodes were prepared in the same manner as in Examples III-1 by employing the powdery hydrogen-absorbing alloy samples thus obtained. Then, nickel-hydrogen secondary batteries each having a battery capacity of 1,000 mAh and having the construction shown in FIG. 8 were fabricated by employing the hydrogen-absorbing alloy electrodes thus prepared as their negative electrodes. The nickel-hydrogen secondary batteries were examined in the same manner as in Examples III-1 for determination of the initial discharge capacity and initial battery inner pressure T characteristic thereof. The results are shown in Table 3-9 along with the treatment conditions.

TABLE 3-9

| pH at Addition of Alkaline Solution | Initial Discharge Capacity (mAh) | Inner Pressure T Characteristic (min) |
|---|---|---|
| 1 | 700 | 110 |
| 2 | 820 | 140 |
| 3 | 820 | 145 |
| 4 | 830 | 150 |
| 5 | 820 | 145 |
| 6 | 810 | 135 |
| 7 | 810 | 135 |

EXAMPLES III-10

In Examples III-10, samples of a powdery hydrogen-absorbing alloy represented by a composition formula of $ZrNi_{1.0}V_{0.7}Mn_{0.3}$ were immersed in hydrochloric acid aqueous solutions (metal-ion-containing acid treatment solutions) each having pH 0.7 and containing 0.2 wt % of nickel chloride $NiCl_2$ as in Example III-7 and, when the pH levels of the metal-ion-containing treatment solutions reached pH levels shown in Table 3-10, a potassium hydroxide aqueous solution (alkaline solution) having pH 14 or higher and a specific gravity of 1.30 was added to the respective treatment solutions in a proportion of 10% for treatment of the alloy samples. The powdery hydrogen-absorbing alloy samples thus treated were filtered out with suction, rinsed with water and dried.

In turn, hydrogen-absorbing alloy electrodes were prepared in the same manner as in Examples III-1 by employing the powdery hydrogen-absorbing alloy samples thus obtained. Then, nickel-hydrogen secondary batteries each having a battery capacity of 1,000 mAh and having the construction shown in FIG. 8 were fabricated by employing the hydrogen-absorbing alloy electrodes thus prepared as their negative electrodes. The nickel-hydrogen secondary batteries were examined in the same manner as in Examples III-1 for determination of the initial discharge capacity and initial battery inner pressure T characteristic thereof. The results are shown in Table 3-10 along with the treatment conditions.

TABLE 3-10

| pH at Addition of Alkaline Solution | Initial Discharge Capacity (mAh) | Inner Pressure T Characteristic (min) |
|---|---|---|
| 1 | 700 | 110 |
| 2 | 820 | 140 |
| 3 | 820 | 140 |
| 4 | 800 | 140 |
| 5 | 800 | 145 |
| 6 | 755 | 125 |
| 7 | 750 | 120 |

As apparent from Tables 3-9 and 3-10, the nickel-hydrogen secondary batteries which employed the hydrogen-absorbing alloy electrodes formed of the hydrogen-absorbing alloy samples obtained by surface-treating the Mm-bases and Laves-phase hydrogen-absorbing alloys with the metal-ion-containing acid treatment solution containing nickel chloride $NiCl_2$ to which the alkaline solution was added when the pH levels of the metal-ion-containing acid treatment solutions reached a pH range between pH 2 and pH 6 each exhibited a higher initial discharge capacity and a more excellent battery initial inner pressure T characteristic (a longer charging time t).

EXAMPLES III-11

In Examples III-11, samples of a powdery hydrogen-absorbing alloy represented by a composition formula of $MmNi_{3.1}Co_{1.0}Mn_{0.5}Al_{0.4}$ were immersed in metal-ion-containing acid treatment solutions each having pH 0.7 and containing 0.2 wt % of nickel chloride $NiCl_2$ for 15 minutes as in Example III-4 and, when the pH levels of the metal-ion-containing treatment solutions rose to pH 4, the alkaline solution was added to the metal-ion-containing treatment solutions in proportions of 5%, 10%, 15%, 20%, 25% and 30% (see Table 3-11) for surface treatment of the alloy samples. The powdery hydrogen-absorbing alloy samples thus treated were filtered out with suction, rinsed with water, and dried.

The hydrogen-absorbing alloy samples thus obtained were each analyzed by the X-ray photo-electron spectrophotometry (XPS) for surface analysis thereof, and the ratio of the amount of hydroxides to the amount of metals (hydroxides/metals) on the alloy surface was determined. The results are shown in Table 3-11.

In turn, hydrogen-absorbing alloy electrodes were prepared in the same manner as in Examples III-1 by employing the powdery hydrogen-absorbing alloy samples thus obtained. Then, nickel-hydrogen secondary batteries each having a battery capacity of 1,000 mAh and having the construction shown in FIG. 8 were fabricated by employing the hydrogen-absorbing alloy electrodes thus prepared as their negative electrodes. The nickel-hydrogen secondary batteries were examined in the same manner as in Examples III-1 for determination of the initial discharge capacity and initial batter inner pressure T characteristic thereof. The results are shown in Table 3-11 along with the treatment conditions.

TABLE 3-11

| Proportion of Added Alkaline Solution (%) | Surface Composition of Hydrogen-Absorbing Alloy (Hydroxides/metals) | Initial Discharge Capacity (mAh) | Inner Pressure T Characteristic (min) |
|---|---|---|---|
| 5  | ≈1  | 820 | 145 |
| 10 | ≈1  | 830 | 150 |
| 15 | ≈1  | 830 | 150 |
| 20 | ≈1  | 825 | 150 |
| 25 | ≈1  | 820 | 150 |
| 30 | <<1 | 750 | 120 |

As apparent from Table 3-11, the nickel-hydrogen secondary batteries which employed the hydrogen-absorbing alloy ectrodes formed of the hydrogen-absorbing alloy samples obtained by treating the Mm-based hydrogen-absorbing alloy with the metal-ion-containing acid treatment solutions each containing nickel chloride $NiCl_2$ to which the alkaline solution having pH 4 or higher was added in proportions of 5 to 25% when the pH levels of the metal-ion-containing acid treatment solutions reached pH 4 each exhibited a higher initial discharge capacity and a more excellent battery initial inner pressure T characteristic (a longer charging time t).

The hydrogen-absorbing alloy sample subjected to the surface treatment in which the alkaline solution was added to the metal-ion-containing acid solution in a proportion of 30% had an excessively large amount of hydroxides on this surface, so that the surface conductivity thereof was reduced. The nickel-hydrogen secondary battery employing the hydrogen-absorbing alloy electrode formed of the hydrogen-absorbing alloy sample had a reduced initial discharge capacity and a deteriorated initial inner pressure T characteristic.

Although the Mm-based hydrogen-absorbing alloy was used in Examples III-11, the same tendency was observed in the case where a Laves-phase hydrogen-absorbing alloy was used.

A hydrogen-absorbing alloy electrode as defined in the appended claim 24 is formed of a Misch metal based hydrogen-absorbing alloy of $AB_x$ type (wherein A comprises a Misch metal, B comprises at least one of nickel and cobalt and the atomic ratio x is $4.4 \leq x \leq 5.4$) which is treated with an acid treatment solution so that a surface layer thereof having a thickness of 80 Å as measured from the outermost surface thereof has a composition ratio B/A of the B-component to the A-component of 3.1 to 6.5. As proven in the foregoing examples, by thus treating the hydrogen-absorbing alloy, the activity of the alloy can be improved without reduction in the surface conductivity thereof. Where the hydrogen-absorbing electrode is employed as a negative electrode for an alkaline secondary battery such as a nickel-hydrogen secondary battery, effective absorption of hydrogen in the hydrogen-absorbing alloy can be ensured from the initial cycle. As a result, the initial capacity of the alkali secondary battery is improved, and the battery inner pressure rise can be suppressed.

A hydrogen-absorbing alloy electrode as defined in the appended claim 28 is formed of a Laves-phase hydrogen-absorbing alloy of $AB_x$ type (wherein A comprises at least one of zirconium and titanium, B comprises at least nickel and the atomic ratio x is $1.8 \leq x \leq 2.2$) which is treated with an acid treatment solution so that a surface layer thereof having a thickness of 80 Å as measured from the outermost surface thereof has a composition ratio B/A of the B-component to the A-component of 1.5 to 3.5. By thus treating the hydrogen-absorbing alloy, the activity of the alloy can be improved without reduction in the surface conductivity thereof like the hydrogen-absorbing alloy electrode defined in the claim 24. Where the hydrogen-absorbing electrode is employed as a negative electrode for an alkaline secondary battery such as a nickel-hydrogen secondary battery, effective absorption-of hydrogen in the hydrogen-absorbing alloy can be ensured from the initial cycle. As a result, the initial capacity of the alkali secondary battery is improved, and the battery inner pressure rise can be suppressed.

In the treatment process, an oxide film and the like on the surface of the hydrogen-absorbing alloy are satisfactorily removed and the leach-out of the constituents of the hydrogen-absorbing alloy is properly controlled by treating the hydrogen-absorbing alloy in an acid treatment solution initially having a pH level in a range between pH 0.7 and 1.8 and adding an alkaline solution to the acid treatment solution when the pH level of the acid treatment solution rises to a pH range between pH 2 and pH 6. Therefore, the resulting hydrogen-absorbing alloy has a high electrochemical activity. An alkaline secondary battery employing the hydrogen-absorbing alloy as its negative electrode active substance has a remarkably improved initial discharge capacity and inner pressure T characteristic.

Further, by surface-treating the hydrogen-absorbing alloy with an acid treatment solution containing at least one compound selected from the group consisting of nickel compounds and cobalt compounds, the oxide film and the like on the surface of the hydrogen-absorbing alloy are removed, and a greater amount of highly active nickel and cobalt are deposited on the surface of the hydrogen-absorbing alloy. Therefore, a hydrogen-absorbing alloy electrode formed of the hydrogen-absorbing alloy thus treated has an improved activity from the initial cycle. Where an alkaline secondary battery such as a nickel-hydrogen secondary battery is fabricated by employing the hydrogen-absorbing alloy electrode as its negative electrode, effective absorption of hydrogen in the hydrogen-absorbing alloy can be ensured from the initial cycle.

(4) Embodiment According to Fourth Inventive Mode Group

The fourth inventive mode group relates to a hydrogen-absorbing alloy electrode employing a hydrogen-absorbing alloy having on its surface a film of an oxide or hydroxide of a metal selected from the group consisting of an alkaline earth metal, copper and cobalt. Like the foregoing inventive mode groups, the fourth inventive mode group will hereinafter be described in detail by way of examples regarding hydrogen-absorbing alloy electrodes and their production methods.

EXAMPLES IV-1 TO IV-8

In Examples IV-1 to IV-8, 99.9% pure metal Ni, Co, Al and Mn and a Misch metal (Mm: a mixture of rare earth metals) were mixed together in a predetermined molar ratio, and the resulting mixture was melted in an arc melt furnace in an argon atmosphere. Then, the resulting melt was allowed to stand for cooling thereof. Thus, an ingot of a hydrogen-absorbing alloy represented by a composition formula of $MmNi_{3.1}Co_{1.0}Al_{0.3}Mn_{0.6}$ was obtained. The hydrogen-absorbing alloy ingot was mechanically pulverized in an inert atmosphere. Thus, a powdery hydrogen-absorbing alloy having an average particle diameter of 80 µm was obtained.

Samples of the powdery hydrogen-absorbing alloy thus obtained were respectively immersed for 15 minutes in hydrochloric acid solutions (hereinafter referred to as "metal-ion-containing acid treatment solutions") having pH 1.0 and containing $MgCl_2$(alkaline earth metal salt) in proportions (wt %) as shown in Table 4-1 for surface treatment thereof. The alloy samples thus treated were filtered out with suction, rinsed with water and dried. Thus, acid-treated hydrogen-absorbing alloy samples according to Examples IV-1 to IV-8 were obtained.

The acid-treated hydrogen-absorbing alloy samples were each analyzed by means of an electron transmissive microscope for surface analysis thereof. It was found that the hydrogen-absorbing alloy samples each had a film of an oxide or hydroxide of Mg on the surface thereof. Further, the thickness of the film was measured. The results are shown in Table 4-1.

In turn, 100 parts by weight of each of the powdery hydrogen-absorbing alloy samples to be used as a negative electrode active substance was mixed with 20 parts by weight of a 5 wt % polyethylene oxide aqueous solution as a binder for preparation of an alloy paste. The alloy paste was applied on both sides of a collector of a nickel-plated punching metal, and dried. Then, the resulting collector was cut into a predetermined size. Thus, hydrogen-absorbing alloy electrodes according to Examples IV-1 to IV-8 were prepared.

Subsequently, a nickel-hydrogen secondary battery having a battery capacity of 1,000 mAh was fabricated by employing each of the hydrogen-absorbing alloy electrodes according to Examples IV-1 to IV-8 as its negative electrode, a common sintered nickel electrode as its positive electrode and an alkaline-resistant nonwoven fabric as its separator. The battery had the construction shown in FIG. 8.

Comparative Example IV-1

A powdery hydrogen-absorbing alloy represented by a composition formula of $MmNi_{3.1}Co_{1.0}Al_{0.3}Mn_{0.6}$ and having an average particle diameter of 80 $\mu$m was prepared in the same manner as in Examples IV-1 to IV-8. A sample of the powdery hydrogen-absorbing alloy thus prepared was surface-treated by immersing the alloy sample for 15 minutes in a hydrochloric acid solution having pH 0.7 and containing neither an alkaline earth metal salt nor a copper salt. The alloy sample thus treated was filtered out with suction, rinsed with water and dried. Thus, a hydrogen-absorbing alloy sample according to Comparative Examples IV-1 was obtained.

The surface-treated hydrogen-absorbing alloy sample was analyzed by means of an electron transmissive microscope for surface analysis thereof. It was found that the hydrogen-absorbing alloy sample had a film of an oxide of Mn and the like on the surface thereof. The thickness of the film is shown in Table 4-1.

Subsequently, a nickel-hydrogen alloy electrode according to Comparative Example IV-1 was prepared in substantially the same manner as in Examples IV-1 to IV-8 by employing the powdery hydrogen-absorbing alloy. Further, a nickel-hydrogen secondary battery was fabricated in the same manner as described above by employing the hydrogen-absorbing alloy electrode.

EXAMPLES IV-9 TO IV-16

In Examples IV-9 to IV-16, a powdery hydrogen-absorbing alloy having the same composition as in Examples IV-1 to IV-8 and an average particle diameter of 80 $\mu$m was prepared by a gas atomizing method. Samples of the powdery hydrogen-absorbing alloy were surface-treated in substantially the same manner as in Examples IV-1 to IV-8 by respectively immersing the alloy samples for 15 minutes in metal-ion-containing acid treatment solution having pH 1.0 and containing $MgCl_2$ in proportions (wt %) shown in Table 4-1. The alloy samples thus treated were filtered out with suction, rinsed with water and dried. Thus, acid-treated powdery hydrogen-absorbing alloy samples according to Examples IV-9 to IV-16 were obtained.

The acid-treated powdery hydrogen-absorbing alloy samples were analyzed in the same manner as described above by means of an electron transmissive microscope for surface analysis thereof. It was found that the hydrogen-absorbing alloy samples each had a film of an oxide or hydroxide of Mg on the surface thereof. Further, the thickness of the film was measured. The results are shown in Table 4-1.

Subsequently, nickel-hydrogen alloy electrodes according to Example IV-9 to IV-16 were prepared in substantially the same manner as in Examples IV-1 to IV-8 by employing the surface-treated powdery hydrogen-absorbing alloy samples. Further, nickel-hydrogen secondary batteries each having a battery capacity of 1,000 mAh and having the construction shown in FIG. 8 were fabricated by employing the hydrogen-absorbing alloy electrodes.

Comparative Example IV-2

In Comparative Example IV-2, a powdery hydrogen-absorbing alloy having an average particle diameter of 80 $\mu$m was prepared in the same manner as in Examples IV-9 to IV-16 by a gas atomizing method. A sample of the powdery hydrogen-absorbing alloy was surface-treated in substantially the same manner as in Comparative Example IV-1 by immersing the alloy sample for 15 minutes in a hydrochloric acid solution having pH 0.7 and containing neither an alkaline earth metal salt nor a copper salt. The alloy sample thus treated was filtered out with suction, rinsed with water and dried.

The surface-treated powdery hydrogen-absorbing alloy sample was analyzed by means of an electron transmissive microscope for surface analysis thereof. It was found that the hydrogen-absorbing alloy sample had a film of an oxide of Mn and the like on the surface thereof as in Comparative Example IV-1. Further, the thickness of the film was measured. The result is shown in Table 4-1.

Subsequently, a nickel-hydrogen alloy electrode according to Comparative Example IV-2 was prepared in substantially the same manner as in Examples IV-1 to IV-8 by employing the powdery hydrogen-absorbing alloy sample thus surface-treated. Further, a nickel-hydrogen secondary battery was fabricated in the same manner as described above by employing the hydrogen-absorbing alloy electrode.

Determination of Battery Characteristics

The nickel-hydrogen secondary batteries fabricated by employing the hydrogen-absorbing alloy electrodes according to Examples IV-1 to IV-16 and Comparative Examples IV-1 and IV-2 were each charged at a charge current of 0.2 C. for 6 hours at room temperature, and than discharge at a discharge current of 0.2 C. to a discharge termination voltage of 1.0V at room temperature for determination of the initial discharge capacity thereof. The results are shown in Table 4-1 along with the other conditions.

Further, the nickel-hydrogen secondary batteries were each charged at a charge current of 0.2 C. for 6 hours at room temperature, and then discharged at a discharge current of 0.2 C. to a discharge termination voltage of 1.0V at 0° C. for determination of the low-temperature discharge capacity thereof. It is noted that the low-temperature discharge capacities determined in the following experiments were all measured at 0° C. The results are shown in Table 4-1.

TABLE 4-1

|  | Proportion of Added MgCl$_2$ (wt %) | Thickness of Surface Layer (nm) | Discharge Capacity (mAh) | |
| --- | --- | --- | --- | --- |
|  |  |  | Initial | At Low Temp. |
| Ex.IV-1 | 0.5 | 11.5 | 620 | 450 |
| Ex.IV-2 | 1.0 | 15.5 | 800 | 670 |
| Ex.IV-3 | 2.0 | 27.5 | 820 | 675 |
| Ex.IV-4 | 3.0 | 32.6 | 830 | 695 |
| Ex.IV-5 | 4.0 | 39.5 | 825 | 670 |
| Ex.IV-6 | 5.0 | 48.9 | 820 | 675 |
| Ex.IV-7 | 6.0 | 53.4 | 625 | 450 |
| Ex.IV-8 | 7.0 | 54.7 | 620 | 445 |
| Com.Ex.IV-1 | 0.0 | 9.5 | 620 | 445 |
| Ex.IV-9 | 0.5 | 12.5 | 605 | 435 |
| Ex.IV-10 | 1.0 | 15.1 | 800 | 650 |
| Ex.IV-11 | 2.0 | 29.8 | 815 | 655 |
| Ex.IV-12 | 3.0 | 35.6 | 825 | 675 |
| Ex.IV-13 | 4.0 | 40.5 | 830 | 660 |
| Ex.IV-14 | 5.0 | 49.8 | 825 | 655 |
| Ex.IV-15 | 6.0 | 54.6 | 615 | 455 |
| Ex.IV-16 | 7.0 | 55.8 | 600 | 425 |
| Com.Ex.IV-2 | 0.0 | 8.5 | 600 | 425 |

As apparent from the results shown in Table 4-1, the hydrogen-absorbing alloy electrodes of Examples IV-1 to IV-16 which employed the hydrogen-absorbing alloy samples each having on the surface thereof a film of an oxide or hydroxide of Mg formed through the surface treatment with the metal-ion-containing acid treatment solutions containing MgCl$_2$ (alkaline earth metal salt) each provided for an increased initial discharge capacity and low-temperature discharge capacity, when used in the nickel-hydrogen secondary batteries, in comparison with the hydrogen-absorbing alloy electrodes of Comparative Examples IV-1 and IV-2 which employed the hydrogen-absorbing alloy samples surface-treated with the hydrochloric acid solutions not containing MgCl$_2$. Particularly, the hydrogen-absorbing alloy electrodes of Examples IV-2 to IV-6 and IV-10 to IV-14 which employed the hydrogen-absorbing alloy samples each having on the surface thereof a 15 nm to 50 nm thick film of an oxide or hydroxide of Mg (the thickness of the film experimentally determined was 15.5 nm to 48.9 nm or 15.1 nm to 49.8 nm) formed through the surface treatment with the treatment solutions containing MgCl$_2$ in proportions of 1 wt % to 5 wt % each provided for a remarkably increased initial discharge capacity and low-temperature discharge capacity.

EXAMPLES IV-17 TO IV-22

In Examples IV-17 to IV-22, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in metal-ion-containing acid treatment solutions containing MgCl$_2$ in a proportion of 3.0 wt % and respectively having initial pH levels as shown in Table 4-2. In substantially the same manner as in Examples IV-1 to IV-8, hydrogen-absorbing alloy electrodes of Examples IV-17 to IV-22 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Mg on the surface thereof. Further, the thickness of the film was measured. The results are shown in Table 4-2.

EXAMPLES IV-23 TO IV-28

In Examples IV-23 to IV-28, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in metal-ion-containing acid treatment solutions containing MgCl$_2$ in a proportion of 3.0 wt % and respectively having initial pH levels as shown in Table 4-2. In the same manner as in Examples IV-1 to IV-8, hydrogen-absorbing alloy electrodes of Examples IV-23 to IV-28 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Mg on the surface thereof. Further, the thickness of the film was measured. The results are shown in Table 4-2.

Battery Characteristics of Examples IV-17 to IV-28

The initial discharge capacity and low-temperature discharge capacity of each of the nickel-hydrogen secondary batteries respectively employing the hydrogen-absorbing alloy electrodes of Examples IV-17 to IV-28 were determined in the same manner as described above. The results are shown in Table 4-2 along with the other conditions.

TABLE 4-2

|  | Initial pH of Acid Solution | Thickness of Surface Layer (nm) | Discharge Capacity (mAh) | |
| --- | --- | --- | --- | --- |
|  |  |  | Initial | At Low Temp. |
| Ex.IV-17 | 0.5 | 58.9 | 620 | 450 |
| Ex.IV-18 | 0.7 | 45.4 | 815 | 660 |
| Ex.IV-19 | 1.0 | 32.6 | 830 | 695 |
| Ex.IV-20 | 1.5 | 25.8 | 830 | 685 |
| Ex.IV-21 | 2.0 | 19.6 | 815 | 675 |
| Ex.IV-22 | 2.5 | 12.7 | 645 | 485 |
| Ex.IV-23 | 0.5 | 56.4 | 610 | 435 |
| Ex.IV-24 | 0.7 | 44.8 | 800 | 650 |
| Ex.IV-25 | 1.0 | 35.6 | 825 | 675 |
| Ex.IV-26 | 1.5 | 27.6 | 825 | 670 |
| Ex.IV-27 | 2.0 | 20.4 | 820 | 665 |
| Ex.IV-28 | 2.5 | 13.6 | 635 | 470 |

As apparent from the results shown in Table 4-2, where the hydrogen-absorbing alloy electrodes of Examples IV-18 to IV-21 and IV-24 to IV-27 were used which employed the hydrogen-absorbing alloy samples each having on the surface thereof a 20 nm to 45 nm thick film of an oxide or hydroxide of Mg (the thickness of the film experimentally determined was 19.6 nm to 45.4 nm or 20.4 nm to 44.8 nm) formed through the surface treatment with the metal-ion-containing acid treatment solutions containing MgCl$_2$ (alkaline earth metal salt) and respectively having initial pH levels of pH 0.7 to pH 2.0, the initial discharge capacity and the low-temperature discharge capacity were remarkably increased. Thus, the hydrogen-absorbing alloy electrodes each provided for a remarkably improved initial discharge characteristic and low-temperature discharge characteristic.

EXAMPLES IV-29 TO IV-36

In Examples IV-29 to IV-36, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in metal-ion-containing acid treatment solutions respectively containing $CaCl_2$ (alkaline earth metal salt) in proportions as shown in Table 4-3 and having pH 1.0. In substantially the same manner as in Examples IV-1 to IV-8, hydrogen-absorbing alloy electrodes of Examples IV-29 to IV-36 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Ca on the surface thereof. The thickness of the film on each of the alloy samples is shown in Table 4-3.

EXAMPLES IV-37 TO IV-44

In Examples IV-37 to IV-44, a powdery hydrogen-absorbing alloy having an average particle diameter of 80 μm was prepared in the same manner as in Examples IV-9 to IV-14. Samples of the powdery hydrogen-absorbing alloy were surface-treated by respectively immersing the alloy samples for 15 minutes in metal-ion-containing acid treatment solutions respectively containing $CaCl_2$ (alkaline earth metal salt) in proportions as shown in Table 4-3 and having pH 1.0. In the same manner as in Examples IV-1 to IV-8, hydrogen-absorbing alloy electrodes of Examples IV-37 to IV-44 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Ca on the surface thereof. The thickness of the film on each of the alloy samples is shown in Table 4-3.

Battery Characteristics of Examples IV-29 to IV-44

The initial discharge capacity and low-temperature discharge capacity of each of the nickel-hydrogen secondary batteries respectively employing the hydrogen-absorbing alloy electrodes of Examples IV-29 to IV-44 were determined in the same manner as described above. The results are shown in Table 4-3 along with the other conditions.

TABLE 4-3

| | Amount of Added $CaCl_2$ | Thickness of Surface Layer | Discharge Capacity (mAh) | |
|---|---|---|---|---|
| | (wt %) | (nm) | Initial | At Low Temp. |
| Ex.IV-29 | 0.5 | 10.8 | 625 | 445 |
| Ex.IV-30 | 1.0 | 15.8 | 820 | 665 |

TABLE 4-3-continued

| | Amount of Added $CaCl_2$ | Thickness of Surface Layer | Discharge Capacity (mAh) | |
|---|---|---|---|---|
| | (wt %) | (nm) | Initial | At Low Temp. |
| Ex.IV-31 | 2.0 | 29.8 | 825 | 670 |
| Ex.IV-32 | 3.0 | 34.5 | 830 | 695 |
| Ex.IV-33 | 4.0 | 42.5 | 825 | 685 |
| Ex.IV-34 | 5.0 | 49.8 | 820 | 680 |
| Ex.IV-35 | 6.0 | 52.6 | 630 | 455 |
| Ex.IV-36 | 7.0 | 55.4 | 620 | 445 |
| Ex.IV-37 | 0.5 | 11.6 | 615 | 440 |
| Ex.IV-38 | 1.0 | 15.7 | 805 | 660 |
| Ex.IV-39 | 2.0 | 30.5 | 815 | 660 |
| Ex.IV-40 | 3.0 | 36.8 | 825 | 680 |
| Ex.IV-41 | 4.0 | 41.6 | 830 | 660 |
| Ex.IV-42 | 5.0 | 48.7 | 830 | 655 |
| Ex.IV-43 | 6.0 | 54.0 | 620 | 450 |
| Ex.IV-44 | 7.0 | 55.5 | 600 | 425 |

As apparent from the results shown in Table 4-3, where the hydrogen-absorbing alloy electrodes of Examples IV-30 to IV-34 and IV-38 to IV-42 were used which employed the hydrogen-absorbing alloy samples each having on the surface thereof a 15 nm to 50 nm thick film of an oxide or hydroxide of Ca (the thickness of the film experimentally determined was 15.8 nm to 49.8 nm or 15.7 nm to 48.7 nm) formed through the surface treatment with the metal-ion-containing acid treatment solutions containing $CaCl_2$ (alkaline earth metal salt) in proportions of 1 wt % to 5 wt %, the initial discharge capacity and the low-temperature discharge capacity were remarkably increased.

EXAMPLES IV-45 TO IV-50

In Examples IV-45 to IV-50, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in metal-ion-containing acid treatment solutions containing $CaCl_2$ in a proportion of 3.0 wt % and respectively having initial pH levels as shown in Table 4-4. In the same manner as in Examples IV-1 to IV-8, hydrogen-absorbing alloy electrodes of Examples IV-45 to IV-50 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Ca on the surface thereof. Further, the thickness of the film was measured. The results are shown in Table 4-4.

EXAMPLES IV-51 TO IV-56

In Examples IV-51 to IV-56, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in metal-ion-containing acid treatment solutions containing $CaCl_2$ in a proportion of 3.0 wt % and respectively having initial pH levels as shown in Table 4-4. In the same manner as in Examples IV-1 to IV-8, hydrogen-absorbing alloy electrodes of Examples IV-51 to IV-56 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Ca on the surface thereof. Further, the thickness of the film was measured. The results are shown in Table 4-4.

Battery Characteristics of Examples IV-45 to IV-56

The initial discharge capacity and low-temperature discharge capacity of each of the nickel-hydrogen secondary batteries respectively employing the hydrogen-absorbing alloy electrodes of Examples IV-45 to IV-56 were determined in the same manner as described above. The results are shown in Table 4-4 along with the other conditions.

TABLE 4-4

| | Initial pH of Acid Solution | Thickness of Surface Layer (nm) | Discharge Capacity (mAh) | |
|---|---|---|---|---|
| | | | Initial | At Low Temp. |
| Ex.IV-45 | 0.5 | 59.7 | 625 | 445 |
| Ex.IV-46 | 0.7 | 44.0 | 820 | 660 |
| Ex.IV-47 | 1.0 | 34.5 | 830 | 695 |
| Ex.IV-48 | 1.5 | 26.6 | 830 | 680 |
| Ex.IV-49 | 2.0 | 17.4 | 815 | 670 |
| Ex.IV-50 | 2.5 | 12.7 | 645 | 485 |
| Ex.IV-51 | 0.5 | 57.7 | 620 | 425 |
| Ex.IV-52 | 0.7 | 43.6 | 800 | 650 |
| Ex.IV-53 | 1.0 | 36.8 | 825 | 680 |
| Ex.IV-54 | 1.5 | 25.9 | 820 | 675 |
| Ex.IV-55 | 2.0 | 19.8 | 820 | 665 |
| Ex.IV-56 | 2.5 | 12.7 | 630 | 440 |

As apparent from the results shown in Table 4-4, where the hydrogen-absorbing alloy electrodes of Examples IV-46 to IV-49 and IV-52 to IV-55 were used which employed the hydrogen-absorbing alloy samples each having on the surface thereof a 19 nm to 45 nm thick film of an oxide or hydroxide of Ca (the thickness of the film experimentally determined was 17.4 nm to 44.0 nm or 19.8 nm to 43.6 nm) formed through the surface treatment with the metal-ion-containing acid treatment solutions containing $CaCl_2$ (alkaline earth metal salt) and respectively having initial pH levels of pH 0.7 to pH 2.0, the initial discharge capacity and the low-temperature discharge capacity were remarkably increased.

EXAMPLES IV-57 TO IV-64

In Examples IV-57 to IV-64, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in metal-ion-containing hydrochloric acid solutions respectively containing $CuCl_2$ (copper salt) in proportions as shown in Table 4-5 and having pH 1.0. In the same manner as in Examples IV-1 to IV-8, hydrogen-absorbing alloy electrodes of Examples IV-57 to IV-64 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Cu on the surface thereof. The thickness of the film on each of the alloy samples is shown in Table 4-5.

EXAMPLES IV-65 TO IV-72

In Examples IV-65 to IV-72, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in hydrochloric acid solutions (metal-ion-containing acid treatment solutions) respectively containing $CuCl_2$ in proportions (wt %) as shown in Table 4-5 and having pH 1.0. In the same manner as in Examples IV-1 to IV-8, hydrogen-absorbing alloy electrodes of Examples IV-65 to IV-72 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Cu of the surface thereof. The thickness of the film on each of the alloy samples is shown in Table 4-5.

Battery Characteristics of Examples IV-57 to IV-72

The initial discharge capacity and low-temperature discharge capacity of each of the nickel-hydrogen secondary batteries respectively employing the hydrogen-absorbing alloy electrodes of Examples IV-57 to IV-72 were determined in the same manner as described above. The results are shown in Table 4-5 along with the other conditions.

The nickel-hydrogen secondary batteries employing the hydrogen-absorbing alloy electrodes of Examples IV-57 to IV-72 prepared in the aforesaid manner were each charged at a charge current of 200 mA (0.2 C.) for 6 hours at room temperature, and then discharged at a high discharge current of 5,000 mA (5.0 C.) to a discharge termination voltage of 1.0V for determination of the high-rate discharge capacity thereof. The results are shown in Table 4-5 along with the other conditions. It is noted that the high-rate discharge capacity herein mentioned and the high-rate discharge capacity characteristic mentioned in the embodiment according to the second inventive mode group were determined under different measurement conditions.

TABLE 4-5

| | Amount of Added $CuCl_2$ (wt %) | Thickness of Surface Layer (nm) | Discharge Capacity (mAh) | | |
|---|---|---|---|---|---|
| | | | Initial | Low-Temp | High-Rate |
| Ex.IV-57 | 0.5 | 10.2 | 625 | 445 | 620 |
| Ex.IV-58 | 1.0 | 15.9 | 805 | 675 | 815 |
| Ex.IV-59 | 2.0 | 26.4 | 815 | 680 | 820 |
| Ex.IV-60 | 3.0 | 31.8 | 830 | 690 | 825 |
| Ex.IV-61 | 4.0 | 38.7 | 820 | 690 | 830 |
| Ex.IV-62 | 5.0 | 47.9 | 820 | 680 | 820 |
| Ex.IV-63 | 6.0 | 52.2 | 625 | 445 | 610 |
| Ex.IV-64 | 7.0 | 55.4 | 620 | 445 | 605 |
| Ex.IV-65 | 0.5 | 11.4 | 620 | 440 | 615 |
| Ex.IV-66 | 1.0 | 15.8 | 805 | 660 | 815 |
| Ex.IV-67 | 2.0 | 28.6 | 815 | 665 | 825 |
| Ex.IV-68 | 3.0 | 34.2 | 830 | 675 | 830 |
| Ex.IV-69 | 4.0 | 40.0 | 825 | 670 | 825 |

TABLE 4-5-continued

| | Amount of Added CuCl$_2$ | Thickness of Surface Layer | Discharge Capacity (mAh) | | |
|---|---|---|---|---|---|
| | (wt %) | (nm) | Initial | Low-Temp | High-Rate |
| Ex.IV-70 | 5.0 | 48.9 | 820 | 660 | 820 |
| Ex.IV-71 | 6.0 | 54.9 | 620 | 460 | 620 |
| Ex.IV-72 | 7.0 | 56.0 | 610 | 440 | 615 |

As apparent from the results shown in Table 4-5, where the hydrogen-absorbing alloy electrodes of Examples IV-58 to IV-62 and IV-66 to IV-70 were used which employed the hydrogen-absorbing alloy samples each having on the surface thereof a 15 nm to 50 nm thick film of an oxide or hydroxide of Cu (the thickness of the film experimentally determined was 15.9 nm to 47.9 nm or 15.8 nm to 48.9 nm) formed through the surface treatment with the metal-ion-containing acid treatment solutions containing CuCl$_2$ in proportions of 1 wt % to 5 wt %, the initial discharge capacity, the low-temperature discharge capacity and the high-rate discharge capacity were remarkably increased. Thus, the initial discharge characteristic, the low-temperature discharge characteristic and the high-rate discharge characteristic were remarkably improved.

EXAMPLES IV-73 TO IV-78

In Examples IV-73 to IV-78, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in hydrochloric acid solutions (metal-ion-containing acid treatment solutions) containing CuCl$_2$ in a proportion of 3.0 wt % and respectively having initial pH levels as shown in Table 4-6. In the same manner as in Examples IV-1 to IV-8, hydrogen-absorbing alloy electrodes of Examples IV-73 to IV-78 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Cu on the surface thereof. Further, the thickness of the film was measured. The results are shown in Table 4-6.

EXAMPLES IV-79 TO IV-84

In Examples IV-79 to IV-84, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in hydrochloric acid solutions (metal-ion-containing acid treatment solutions) containing CuCl$_2$ in a proportion of 3.0 wt % and respectively having initial pH levels as shown in Table 4-6. In the same manner as in Examples IV-1 to IV-8, hydrogen-absorbing alloy electrodes of Examples IV-79 to IV-84 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Cu on the surface thereof. Further, the thickness of the film was measured. The results are shown in Table 4-6.

Battery Characteristics of Examples IV-73 to IV-84

The initial discharge capacity, low-temperature discharge capacity and high-rate discharge capacity of each of the nickel-hydrogen secondary batteries respectively employing the hydrogen-absorbing alloy electrodes of Examples IV-73 to IV-84 were determined in the same manner as described above. The results are shown in Table 4-6 along with the other conditions.

TABLE 4-6

| | Initial pH of Acid Solution | Thickness of Surface Layer (nm) | Discharge Capacity (mAh) | | |
|---|---|---|---|---|---|
| | | | Initial | Low-Temp | High-Rate |
| Ex.IV-73 | 0.5 | 60.2 | 625 | 465 | 615 |
| Ex.IV-74 | 0.7 | 42.6 | 825 | 680 | 820 |
| Ex.IV-75 | 1.0 | 31.8 | 830 | 690 | 825 |
| Ex.IV-76 | 1.5 | 24.4 | 825 | 680 | 820 |
| Ex.IV-77 | 2.0 | 19.6 | 825 | 675 | 820 |
| Ex.IV-78 | 2.5 | 13.8 | 630 | 455 | 610 |
| Ex.IV-79 | 0.5 | 60.0 | 620 | 440 | 605 |
| Ex.IV-80 | 0.7 | 41.9 | 825 | 675 | 820 |
| Ex.IV-81 | 1.0 | 34.2 | 835 | 675 | 825 |
| Ex.IV-82 | 1.5 | 25.4 | 830 | 670 | 820 |
| Ex.IV-83 | 2.0 | 20.2 | 830 | 670 | 820 |
| Ex.IV-84 | 2.5 | 12.8 | 620 | 440 | 610 |

As apparent from the results shown in Table 4-6, where the hydrogen-absorbing alloy electrodes of Examples IV-74 to IV-77 and IV-80 to IV-83 were used which employed hydrogen-absorbing alloy samples each having on the surface thereof a 20 nm to 42 nm thick film of an oxide or hydroxide of Cu (the thickness of the film experimentally determined was 19.6 nm to 42.6 nm or 20.2 nm to 41.9 nm) formed through the surface treatment with the metal-ion-containing acid treatment solutions containing CuCl$_2$ (copper salt) and respectively having initial pH levels of pH 0.7 to pH 2.0, the initial discharge capacity, the low-temperature discharge capacity and the high-rate discharge capacity were remarkably increased. Thus, the initial discharge characteristic, the low-temperature discharge characteristic and the high-rate discharge characteristic were remarkably improved.

EXAMPLES IV-85 TO IV-92

In Examples IV-85 to IV-92, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in metal-ion-containing hydrochloric acid solutions respectively containing Co(OH)$_2$ in proportions (wt %) as shown in Table 4-7 and having pH 1.0. In the same manner as in Examples IV-1 to IV-8, hydrogen-absorbing alloy electrodes of Examples IV-85 to IV-92 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Co on the surface thereof. Further, the thickness of the film was measured. The results are shown in Table 4-7.

EXAMPLES IV-93 TO IV-100

In Examples IV-93 to IV-100, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in hydrochloric acid solutions respectively containing $CO(OH)_2$ in proportions (wt %) as shown in Table 4-7 and having pH 1.0. In the same manner as in Examples IV-1 to IV-8, hydrogen-absorbing alloy electrodes of Examples IV-93 to IV-100 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Co on the surface thereof. Further, the thickness of the film was measured. The results are shown in Table 4-7.

Battery Characteristics of Examples IV-85 to IV-100

The initial discharge capacity and low-temperature discharge capacity of each of the nickel-hydrogen secondary batteries respectively employing the hydrogen-absorbing alloy electrodes of Examples IV-85 to IV-100 were determined in the same manner as described above. The results are shown in Table 4-7.

The nickel-hydrogen secondary batteries employing the hydrogen-absorbing alloy electrodes of Examples IV-85 to IV-100 prepared in the aforesaid manner were each charged at a charge current of 200 mA (0.2 C.) for 6 hours at room temperature, and then discharged at a high discharge current of 5,000 mA (5.0 C.) to a discharge termination voltage of 1.0V for determination of the high-rate discharge capacity thereof. The results are shown in Table 4-7 along with the other conditions.

TABLE 4-7

| | Amount of Added $Co(OH)_2$ | Thickness of Surface Layer | Discharge Capacity (mAh) | | |
|---|---|---|---|---|---|
| | (wt %) | (nm) | Initial | Low-Temp | High-Rate |
| Ex.IV-85 | 0.1 | 2.2 | 630 | 445 | 620 |
| Ex.IV-86 | 0.3 | 5.1 | 805 | 680 | 820 |
| Ex.IV-87 | 0.4 | 10.2 | 810 | 690 | 825 |
| Ex.IV-88 | 0.5 | 17.7 | 840 | 690 | 840 |
| Ex.IV-89 | 0.7 | 39.0 | 830 | 690 | 845 |
| Ex.IV-90 | 1.0 | 48.2 | 830 | 680 | 820 |
| Ex.IV-91 | 1.2 | 51.6 | 660 | 475 | 620 |
| Ex.IV-92 | 1.3 | 59.8 | 620 | 445 | 610 |
| Ex.IV-93 | 0.1 | 2.1 | 620 | 450 | 620 |
| Ex.IV-94 | 0.3 | 5.3 | 815 | 670 | 820 |
| Ex.IV-95 | 0.4 | 12.6 | 820 | 675 | 820 |
| Ex.IV-96 | 0.5 | 20.3 | 830 | 680 | 830 |
| Ex.IV-97 | 0.7 | 38.6 | 820 | 680 | 825 |
| Ex.IV-98 | 1.0 | 49.9 | 820 | 670 | 825 |
| Ex.IV-99 | 1.2 | 53.7 | 630 | 440 | 610 |
| Ex.IV-100 | 1.5 | 59.9 | 620 | 420 | 610 |

As apparent from the results shown in Table 4-7, where the hydrogen-absorbing alloy electrodes of Examples IV-86 to IV-90 and IV-94 to IV-98 were used which employed the hydrogen-absorbing alloy samples each having on the surface thereof a 5 nm to 50 nm thick film of an oxide or hydroxide of Co (the thickness of the film experimentally determined was 5.1 nm to 48.2 nm or 5.3 nm to 49.9 nm) formed through the surface treatment with the metal-ion-containing acid treatment solutions containing $Co(OH)_2$ in proportions of 0.3 wt % to 1.0 wt %, the initial discharge capacity and the low-temperature discharge capacity were remarkably increased, and the high-rate discharge capacity was also increased.

EXAMPLES IV-101 TO IV-106

In Examples IV-101 to IV-106, a powdery hydrogen-absorbing alloy having an average particle diameter of 80 μm was prepared in the same manner as in Examples IV-1 to IV-8. Samples of the powdery hydrogen-absorbing alloy were surface-treated by respectively immersing the alloy samples for 15 minutes in hydrochloric acid solutions containing $CO(OH)_2$ in a proportion of 0.5 wt % and respectively having initial pH levels as shown in Table 4-8. In the same manner as in Examples IV-1 to IV-8, hydrogen-absorbing alloy electrodes of Examples IV-101 to IV-106 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Co on the surface thereof. Further, the thickness of the film was measured. The results are shown in Table 4-8.

EXAMPLES IV-107 TO IV-112

In Examples IV-107 to IV-112, a powdery hydrogen-absorbing alloy having an average particle diameter of 80 μm was prepared in the same manner as in Examples IV-9 to IV-14 by a gas atomizing method. Samples of the powdery hydrogen-absorbing alloy were surface-treated by respectively immersing the alloy samples for 15 minutes in hydrochloric acid solutions containing $Co(OH)_2$ in a proportion of 0.5 wt % and respectively having initial pH levels as shown in Table 4-8. In the same manner as in Examples IV-1 to IV-8, hydrogen-absorbing alloy electrodes of Examples IV-107 to IV-112 were prepared by employing the alloy samples thus treated, and nickel-hydrogen secondary batteries were fabricated by employing the hydrogen-absorbing alloy electrodes.

The surface-treated powdery hydrogen-absorbing alloy samples were analyzed by means of an electron transmissive microscope for surface analysis thereof. It was found that the hydrogen-absorbing alloy samples each had a film of an oxide or hydroxide of Co on the surface thereof. Further, the thickness of the film was measured. The results are shown in Table 4-8.

Battery Characteristics of Examples IV-101 to IV-112

The initial discharge capacity, low-temperature discharge capacity and high-rate discharge capacity of each of the nickel-hydrogen secondary batteries respectively employing the hydrogen-absorbing alloy electrodes of Examples IV-101 to IV-112 were determined in the same manner as described above. The results are shown in Table 4-8 along with the other conditions.

TABLE 4-8

| | Initial pH of Acid Solution | Thickness of Surface Layer (nm) | Discharge Capacity (mAh) | | |
|---|---|---|---|---|---|
| | | | Initial | Low-Temp | High-Rate |
| Ex.IV-101 | 0.3 | 60.0 | 620 | 460 | 620 |
| Ex.IV-102 | 0.5 | 47.6 | 820 | 680 | 815 |
| Ex.IV-103 | 0.7 | 29.2 | 830 | 690 | 825 |
| Ex.IV-104 | 1.0 | 17.7 | 840 | 690 | 840 |
| Ex.IV-105 | 1.5 | 7.4 | 820 | 680 | 820 |
| Ex.IV-106 | 2.0 | 4.8 | 625 | 460 | 620 |
| Ex.IV-107 | 0.3 | 61.2 | 615 | 450 | 610 |
| Ex.IV-108 | 0.5 | 48.2 | 830 | 680 | 825 |
| Ex.IV-109 | 0.7 | 30.4 | 830 | 680 | 830 |
| Ex.IV-110 | 1.0 | 20.3 | 830 | 680 | 830 |
| Ex.IV-111 | 1.5 | 7.7 | 830 | 675 | 825 |
| Ex.IV-112 | 2.0 | 4.6 | 615 | 450 | 620 |

As apparent from the results shown in Table 4-8, where the hydrogen-absorbing alloy electrodes of Examples IV-102 to IV-105 and IV-108 to IV-111 were used which employed the hydrogen-absorbing alloy samples each having on the surface thereof a 7 nm to 48 nm thick film of an oxide or hydroxide of Co (the thickness of the film experimentally determined was 7.4 nm to 47.6 nm or 7.7 nm to 48.2 nm) formed through the surface treatment with the metal-ion-containing acid treatment solutions containing $CO(OH)_2$ (cobalt salt) and respectively having initial pH levels of pH 0.5 to pH 1.5, the initial discharge capacity and the low-temperature discharge capacity were remarkably increased, and the high-rate discharge capacity was also increased.

In the hydrogen-absorbing alloy electrode production process according to the fourth inventive mode group, a hydrogen-absorbing alloy comprising at least nickel and cobalt is surface-treated with an acid treatment solution (metal-ion-containing acid treatment solution) containing at least one salt selected from the group consisting of a salt of an alkaline earth metal, a salt of copper, and cobalt hydroxide so that a film of a compound selected from the group consisting of an oxide or hydroxide of the alkaline earth metal, an oxide or hydroxide of copper and an oxide or hydroxide of cobalt is formed on the surface thereof to protect active nickel and cobalt sites on the alloy surface, and a hydrogen-absorbing alloy electrode is formed of the hydrogen-absorbing alloy thus treated. Where the hydrogen-absorbing alloy electrode is used for an alkaline secondary battery, the film is dissolved in the electrolyte of the battery so that the active nickel and cobalt sites are exposed to the surface of the hydrogen-absorbing alloy.

As a result, the alkaline secondary battery employing the hydrogen-absorbing alloy electrode according to the fourth inventive mode group has an increased initial discharge capacity and low-temperature discharge capacity because the hydrogen-absorbing alloy is active from the initial cycle, and the increase in the battery inner pressure is suppressed because hydrogen is efficiently absorbed in the hydrogen-absorbing alloy. Thus, the alkaline secondary battery has an excellent initial discharge characteristic, low-temperature discharge characteristic and initial inner pressure T characteristic.

Particularly, a hydrogen-absorbing alloy electrode formed of a hydrogen-absorbing alloy having on the surface thereof an oxide or hydroxide of copper or an oxide or hydroxide of cobalt exhibits a higher conductivity, so that an alkaline secondary battery employing the hydrogen-absorbing alloy electrode has an excellent high-rate discharge characteristic.

Further, where the hydrogen-absorbing alloy is surface-treated with an acid treatment solution containing at least one salt selected from the group consisting of an alkaline earth salt and a copper salt in a proportion of 1 wt % to 5 wt % for formation of a 15 nm to 50 nm thick, more preferably 20 nm to 42 nm thick film on the surface thereof, or surface-treated with an acid treatment solution containing cobalt hydroxide in a proportion of 0.3 wt % to 1.0 wt % for formation of a 5 nm to 50 nm thick, more preferably 7 nm to 48 nm thick film on the surface thereof, an alkaline secondary battery employing a hydrogen-absorbing alloy electrode formed of the hydrogen-absorbing alloy has a more excellent initial discharge characteristic, low-temperature discharge characteristic and initial inner pressure T characteristic.

INDUSTRIAL APPLICABILITY

In accordance with the present invention, the electrochemical characteristics of a hydrogen-absorbing alloy can be remarkably improved. By employing the hydrogen-absorbing alloy, a hydrogen-absorbing alloy electrode can be provided which ensures an excellent battery initial inner pressure characteristic, low-temperature discharge characteristic, high-rate discharge characteristic and cycle characteristic. The present invention is useful to improve the performance of an alkaline secondary battery employing a hydrogen-absorbing alloy electrode.

What is claimed is:

1. A process for producing a hydrogen-absorbing alloy electrode having a hydrogen-absorbing alloy as an electrode active substance, comprising a step of immersing the hydrogen-absorbing alloy in a metal ion-containing acid solution having an initial pH level of pH 0.5 to pH 3.0 in which ions of a metal are pre-contained, so as to acid-treat a surface of the hydrogen-absorbing alloy and to attach a compound of the metal to the surface of the hydrogen-absorbing alloy.

2. A hydrogen-absorbing alloy electrode production process as set forth in claim 1, wherein the metal-ion-containing acid treatment solution further contains a substance having a pH buffer action for keeping a pH level of the acid treatment solution within a pH range between pH 4 and pH 6.

3. A hydrogen-absorbing alloy electrode production process as set forth in claim 2, wherein the substance having the pH buffer action is aluminum ions.

4. A hydrogen-absorbing alloy electrode production process as set forth in any of claims 1, 2 and 3, wherein the metal ions are ions of at least one metal selected from the group consisting of nickel and cobalt.

5. A hydrogen-absorbing alloy electrode production process comprising an alloy activation treatment step of immersing a hydrogen-absorbing alloy in an acid treatment solution initially having a pH level of pH 0.5 to pH 3.0, and adding an alkaline solution to the acid treatment solution before a pH level of the acid treatment solution rises to pH 5 to promote a pH rise of the acid treatment solution.

6. A hydrogen-absorbing alloy electrode production process as set forth in claim 5, wherein the alkaline solution is added to the acid treatment solution in which the hydrogen-absorbing alloy is immersed, when the pH level of the acid treatment solution reaches a pH range not lower than pH 4 and lower than pH 5.

7. A hydrogen-absorbing alloy electrode production process as set forth in claim 5, wherein the pH level of the acid treatment solution in which the hydrogen-absorbing alloy is immersed is raised to a pH range between pH 7 and pH 12 by the addition of the alkaline solution.

8. A hydrogen-absorbing alloy electrode production process as set forth in claim 6, wherein the pH level of the acid treatment solution in which the hydrogen-absorbing alloy is immersed is raised to a pH range between pH 7 and pH 12 by the addition of the alkaline solution when the pH level of the acid treatment solution reaches a pH range not lower than pH 4 and lower than pH 5.

9. A hydrogen-absorbing alloy electrode production process comprising an alloy activation treatment step of immersing a hydrogen-absorbing alloy in an acid treatment solution containing metal ions and initially having a pH level of pH 0.5 to pH 3.0, and adding an alkaline solution to the acid treatment solution before a pH level of the acid treatment solution rises to pH 5 to promote a pH rise of the acid treatment solution.

10. A hydrogen-absorbing alloy electrode production process as set forth in claim 9, wherein the alkaline solution is added to the acid treatment solution in which the hydrogen-absorbing alloy is immersed, when the pH level of the acid treatment solution reaches a pH range not lower than pH 4 and lower than pH 5.

11. A hydrogen-absorbing alloy electrode production process as set forth in claim 9, wherein the pH level of the acid treatment solution is raised to pH 12 or higher by the addition of the alkaline solution.

12. A hydrogen-absorbing alloy electrode production process as set forth in claim 9, wherein the pH level of the acid treatment solution in which the hydrogen-absorbing alloy is immersed is raised to pH 12 or higher by the addition of the alkaline solution when the pH level of the acid treatment solution reaches a pH range not lower than pH 4 and lower than pH 5.

13. A hydrogen-absorbing alloy electrode production process as set forth in any of claims 9, 10, 11 and 12, wherein the metal ions are ions of at least one metal selected from the group consisting of nickel, cobalt and aluminum.

14. A hydrogen-absorbing alloy electrode production process comprising an alloy activation treatment step of immersing a hydrogen-absorbing alloy in an acid treatment solution initially having a pH level of pH 0.5 to pH 3.0, and adding an alkaline solution containing metal ions to the acid treatment solution before a pH level of the acid treatment solution rises to pH 5 to promote a pH rise of the acid treatment solution.

15. A hydrogen-absorbing alloy electrode production process as set forth in claim 14, wherein the alkaline solution is added to the acid treatment solution in which the hydrogen-absorbing alloy is immersed to promote the pH rise of the acid treatment solution when the pH level of the acid treatment solution reaches a pH range not lower than pH 4 and lower than pH 5.

16. A hydrogen-absorbing alloy electrode production process as set forth in claim 14, wherein the pH level of the acid treatment solution is raised to pH 12 or higher by the addition of the alkaline solution.

17. A hydrogen-absorbing alloy electrode production process as set forth in claim 14, wherein the pH level of the acid treatment solution in which the hydrogen-absorbing alloy is immersed is raised to pH 12 or higher by the addition of the alkaline solution when the pH level of the acid treatment solution reaches a pH range not lower than pH 4 and lower than pH 5.

18. A hydrogen-absorbing alloy electrode production process as set forth in claim 14, wherein the metal ions are ions of at least one metal selected from the group consisting of nickel, cobalt and aluminum.

19. A hydrogen-absorbing alloy electrode production process as set forth in claim 18, wherein the pH rise of the acid treatment solution in which the hydrogen-absorbing alloy is immersed is promoted by the addition of the alkaline solution when the pH level of the acid treatment solution reaches a pH range not lower than pH 4 and lower than pH 5.

20. A hydrogen-absorbing alloy electrode production process as set forth in claim 18, wherein the pH level of the acid treatment solution is raised to pH 12 or higher by the addition of the alkaline solution.

21. A hydrogen-absorbing alloy electrode production process as set forth in claim 18, wherein the pH level of the acid treatment solution in which the hydrogen-absorbing alloy is immersed is raised to pH 12 or higher by the addition of the alkaline solution when the pH level of the acid treatment solution reaches a pH range not lower than pH 4 and lower than pH 5.

22. A hydrogen-absorbing alloy electrode production process as set forth in any of claims 9, 10, 11, 12, 13, 14, 15, 16, 17, 18, 19, 20 and 21, wherein at least one of the acid treatment solution and the alkaline solution to be used in the alloy activation treatment step is kept at a temperature of 65° C. or higher.

23. A hydrogen-absorbing alloy electrode production process as set forth in any of claims 9, 10, 11, 12, 13, 14, 15, 16, 17, 18, 19, 20 and 21, wherein the acid treatment solution is kept at a temperature of 65° C. or higher after the addition of the alkaline solution.

24. A hydrogen-absorbing alloy electrode comprising as an electrode active substance thereof a hydrogen-absorbing alloy of $AB_x$ type composed of an A-component of a Misch metal and a B-component including at least one of nickel and cobalt, the hydrogen-absorbing alloy having a surface layer formed through a surface treatment with an acid treatment solution and having a thickness of 80 Å measured from an outermost surface thereof and a core portion inside the surface layer, the surface layer having an atomic ratio x of the B-component to the A-component of $3.1 \leq x \leq 6.5$, the core portion having an atomic ratio x of the B-component to the A-component of $4.4 \leq x \leq 5.4$, the atomic ratio x in the surface layer being different from the atomic ratio x in the core portion.

25. A process for producing a hydrogen-absorbing alloy electrode comprising as an electrode active substance a hydrogen-absorbing alloy of $AB_x$ type composed of an A-component of a Misch metal and a B-component including at least one of nickel and cobalt, the hydrogen-absorbing alloy electrode production process comprising a first treatment step of surface-treating a raw $AB_x$-type hydrogen-absorbing alloy in an acid treatment solution initially having a pH level of pH 0.7 to pH 1.8, and a second treatment step of adding an alkali to the acid treatment solution when a pH level of the acid treatment solution is raised to a pH range between pH 2 and pH 6 by the surface treatment in the first treatment step.

26. A hydrogen-absorbing alloy electrode production process as set forth in claim 25, wherein the acid treatment solution is a metal-ion-containing acid treatment solution containing at least one of a nickel compound and a cobalt compound.

27. A hydrogen-absorbing alloy electrode production process as set forth in claim 25 or 26, wherein the alkali to be added in the second treatment step is an alkaline solution having pH 14 or higher, and the alkaline solution is added to the acid treatment solution in a proportion of 5 wt % to 25 wt % with respect to the acid treatment solution.

28. A hydrogen-absorbing alloy electrode comprising as an electrode active substance thereof a Laves-phase hydrogen-absorbing alloy of $AB_x$ type composed of an A-component including at least one of zirconium and titanium and a B-component including at least nickel, the hydrogen-absorbing alloy comprising a surface layer formed through a surface treatment with an acid treatment solution and having a thickness of 80 Å measured from an outermost surface thereof and a core portion inside the surface layer, the surface layer having an atomic ratio x of the B-component to the A-component of $1.5 \leq x \leq 3.5$, the core portion having an atomic ratio x of the B-component to the A-component of $1.8 \leq x \leq 2.2$, the atomic ratio x in the surface layer being different from the atomic ratio x in the core portion.

29. A process for producing a hydrogen-absorbing alloy electrode comprising as an electrode active substance a Laves-phase hydrogen-absorbing alloy of $AB_x$ type composed of an A-component including at least one of zirconium and titanium and a B-component including at least one of nickel and cobalt, the hydrogen-absorbing alloy electrode production process comprising a first treatment step of surface-treating a raw $AB_x$-type hydrogen-absorbing alloy by immersing the raw alloy in an acid treatment solution initially having a pH level of pH 0.7 to pH 1.8, and a second treatment step of adding an alkali to the acid treatment solution when a pH level of the acid treatment solution is raised to a pH range between pH 2 and pH 6 by the surface treatment in the first treatment step.

30. A hydrogen-absorbing alloy electrode production process as set forth in claim 29, wherein the acid treatment solution is a metal-ion-containing acid treatment solution containing at least one of a nickel compound and a cobalt compound.

31. A hydrogen-absorbing alloy electrode production process as set forth in claim 29 or 30, wherein the alkali to be added in the second treatment step is an alkaline solution having pH 14 or higher, and the alkaline solution is added to the acid treatment solution in a proportion of 5 wt % to 25 wt % with respect to the acid treatment solution.

32. A hydrogen-absorbing alloy electrode comprising as an electrode active substance thereof a hydrogen-absorbing alloy containing at least nickel and cobalt, the hydrogen-absorbing alloy having a film comprising a layer of a deposit formed by at least one compound selected from the group consisting of an oxide and hydroxide of an alkaline earth metal, and an oxide and hydroxide of copper, the compound being formed from alkaline earth metal ions and/or copper ions.

33. A hydrogen-absorbing alloy electrode as set forth in claim 32, wherein the film has a thickness between 15 nm and 50 nm.

34. A hydrogen-absorbing alloy electrode as set forth in claim 32, wherein the film has a thickness between 20 nm and 45 nm if the film is of the oxide or the hydroxide of the alkaline earth metal.

35. A hydrogen-absorbing alloy electrode as set forth in claim 32, wherein the film has a thickness between 20 nm and 42 nm if the film is of the copper oxide or hydroxide.

36. A process for producing a hydrogen-absorbing alloy electrode comprising as an electrode active substance a hydrogen-absorbing alloy containing at least nickel and cobalt, the hydrogen-absorbing alloy electrode production process comprising a surface treatment step of immersing a raw hydrogen-absorbing alloy in a metal-ion-containing acid treatment solution containing at least one metal salt selected from the group consisting of an alkaline earth metal salt and a copper salt dissolved in an acid solution.

37. A hydrogen-absorbing alloy electrode production process as set forth in claim 36, wherein the hydrogen-absorbing alloy contains aluminum in addition to nickel and cobalt.

38. A hydrogen-absorbing alloy electrode production process as set forth in claim 36 or 37, wherein the metal-ion-containing acid treatment solution contains the metal salt in a proportion of 1 wt % to 5 wt % with respect to the acid solution.

39. A hydrogen absorbing alloy electrode comprising as an electrode active substance thereof a hydrogen-absorbing alloy containing at least nickel and cobalt, the hydrogen-absorbing alloy having a film comprising a layer of a deposit that is so formed that an oxide or hydroxide of cobalt formed from cobalt ions is precipitated on the surface of the hydrogen-absorbing alloy.

40. A hydrogen-absorbing alloy electrode as set forth in claim 39, wherein the film has a thickness between 7 nm and 48 nm.

41. A process for producing a hydrogen-absorbing alloy electrode comprising as an electrode active substance a hydrogen-absorbing alloy containing at least nickel and cobalt, the hydrogen-absorbing alloy electrode production process comprising a surface treatment step of immersing a raw hydrogen-absorbing alloy in a cobalt-containing acid treatment solution containing a cobalt salt dissolved in an acid solution.

42. A hydrogen-absorbing alloy electrode production process as set forth in claim 41, wherein the hydrogen-absorbing alloy contains aluminum in addition to nickel and cobalt.

43. A hydrogen-absorbing alloy electrode production process as set forth in claim 41 or 42, wherein the cobalt-containing acid treatment solution contains cobalt hydroxide in a proportion of 0.3 wt % to 1.0 wt % with respect to the acid solution.

* * * * *

UNITED STATES PATENT AND TRADEMARK OFFICE
CERTIFICATE OF CORRECTION

PATENT NO.    : 6,255,018 B1
DATED         : July 3, 2001
INVENTOR(S)   : Tahashi Ise et al.

Page 1 of 1

It is certified that error appears in the above-identified patent and that said Letters Patent is hereby corrected as shown below:

Column 30,
Line 43, after "Table", insert -- 3-4. --;

Column 36,
Line 65, change "batter", to -- battery --; and

Column 37,
In the bottom line of Table 3-11, change " <<1" to -- >>1 --.

Signed and Sealed this

Twenty-sixth Day of March, 2002

Attest:

JAMES E. ROGAN
*Attesting Officer*  *Director of the United States Patent and Trademark Office*